US010951986B2

(12) United States Patent
Seldess

(10) Patent No.: US 10,951,986 B2
(45) Date of Patent: *Mar. 16, 2021

(54) ENHANCED VIRTUAL STEREO REPRODUCTION FOR UNMATCHED TRANSAURAL LOUDSPEAKER SYSTEMS

(71) Applicant: Boomcloud 360, Inc., Encinitas, CA (US)

(72) Inventor: Zachary Seldess, San Diego, CA (US)

(73) Assignee: Boomcloud 360, Inc., Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,237

(22) Filed: Oct. 1, 2019

(65) Prior Publication Data

US 2020/0100046 A1    Mar. 26, 2020

Related U.S. Application Data

(63) Continuation of application No. 16/147,312, filed on Sep. 28, 2018, now Pat. No. 10,499,153.

(Continued)

(51) Int. Cl.
*H04R 3/04* (2006.01)
*H04B 3/32* (2006.01)
(Continued)

(52) U.S. Cl.
CPC ............. *H04R 3/04* (2013.01); *G06F 1/1605* (2013.01); *H04B 3/32* (2013.01); *H04R 1/025* (2013.01);
(Continued)

(58) Field of Classification Search
CPC ......... G06F 1/1605; H04B 3/32; H04R 1/025; H04R 2430/03; H04R 2499/11;
(Continued)

(56) References Cited

U.S. PATENT DOCUMENTS

| 5,930,374 A | 7/1999 | Werrbach et al. |
| 2009/0041265 A1* | 2/2009 | Kubo ............ H04R 3/04 381/98 |

(Continued)

FOREIGN PATENT DOCUMENTS

| CN | 106060710 A | 10/2016 |
| CN | 106887223 A | 6/2017 |
| TW | 201023606 A | 6/2010 |

OTHER PUBLICATIONS

PCT International Search Report and Written Opinion. PCT Application No. PCT/US2018/062489, dated Mar. 20, 2019, ten pages.

(Continued)

*Primary Examiner* — Vivian C Chin
*Assistant Examiner* — Friedrich Fahnert
(74) *Attorney, Agent, or Firm* — Fenwick & West LLP

(57) ABSTRACT

Embodiments relate to an audio processing system that adjusts for unmatched speakers, such as by frequency response, output power, directionality, etc. For example, a mobile device may include an earpiece speaker and a micro-loudspeaker. The audio processing system may include a crossover network that separates an input audio signal into a low frequency signal and a high frequency signal. Subband spatial processing and b-chain processing are applied to the high frequency signal to spatially enhance the input signal, and adjust the input signal for the unmatched speakers. The low frequency signal is processed using a parametric band-pass filter and a first gain to generate a low frequency resonator signal, and a second gain to generate a low frequency passthrough signal. The processed low frequency signals are provided to the micro-loudspeaker by combination with one of a left channel or a right channel of the processed high frequency signal.

30 Claims, 10 Drawing Sheets

Related U.S. Application Data

(60) Provisional application No. 62/592,309, filed on Nov. 29, 2017.

(51) Int. Cl.
    *H04R 5/04*     (2006.01)
    *H04R 5/02*     (2006.01)
    *H04R 5/033*     (2006.01)
    *G06F 1/16*     (2006.01)
    *H04R 1/02*     (2006.01)
    *H04S 7/00*     (2006.01)
    *H04S 1/00*     (2006.01)
    *H01S 1/00*     (2006.01)

(52) U.S. Cl.
    CPC ............... *H04R 5/02* (2013.01); *H04R 5/033* (2013.01); *H04R 5/04* (2013.01); *H04S 1/007* (2013.01); *H04S 7/307* (2013.01); *H04R 2430/03* (2013.01); *H04S 2400/13* (2013.01)

(58) Field of Classification Search
    CPC . H04R 3/04; H04R 5/02; H04R 5/033; H04R 5/04; H04S 1/002; H04S 1/007; H04S 2400/13; H04S 2420/01; H04S 2420/07; H04S 7/302; H04S 7/307

USPC ....... 381/17, 28, 98, 99, 103, 120, 303, 307, 381/310

See application file for complete search history.

(56) References Cited

U.S. PATENT DOCUMENTS

| | | | |
|---|---|---|---|
| 2009/0175466 A1* | 7/2009 | Elko | .................... H04R 25/407 381/94.2 |
| 2009/0296959 A1 | 12/2009 | Bongiovi | |
| 2010/0260356 A1 | 10/2010 | Teramoto et al. | |
| 2011/0280407 A1 | 11/2011 | Skinner et al. | |
| 2013/0322636 A1 | 12/2013 | Vickers | |
| 2015/0092965 A1 | 4/2015 | Umminaer et al. | |
| 2015/0350804 A1 | 12/2015 | Crockett et al. | |
| 2017/0006394 A1 | 1/2017 | Risberg et al. | |
| 2017/0251322 A1 | 8/2017 | Boehm | |
| 2019/0166447 A1 | 5/2019 | Seldess | |

OTHER PUBLICATIONS

Taiwan Intellectual Property Office, Office Action, TW Patent Application No. 107142654, dated Jul. 11, 2019, five pages (with concise explanation of relevance).

* cited by examiner

ENHANCED VIRTUAL STEREO REPRODUCTION FOR UNMATCHED TRANSAURAL LOUDSPEAKER SYSTEMS

CROSS REFERENCE TO RELATED APPLICATION

This application is a continuation of U.S. patent application Ser. No. 16/147,312, filed Sep. 28, 2018, which claims the benefit of U.S. Provisional Application No. 62/592,309, filed Nov. 29, 2017, each incorporated by reference in its entirety.

TECHNICAL FIELD

The subject matter described herein relates to audio processing, and more particularly to a configuration and operation for enhanced virtual stereo reproduction for unmatched transaural loudspeakers.

BACKGROUND

Audio signals can allow a listener to perceive a spatial sense in the sound field. However, many non-ideally configured stereo rendering systems employ moderately to severely unmatched drivers, which are mismatched by frequency response, output power, directionality, or any combination thereof. One such common example system could be a mobile phone or tablet capable of stereo audio playback, but employing only one "broad-band" micro-loudspeaker orthogonally firing in relation to a band-limited earpiece driver with low frequency attenuation below 1000 Hz. The spatial sense in the sound field may be lost or distorted when an audio signal is reproduced using unmatched drivers.

SUMMARY

Embodiments relate to providing a virtual stereo audio reproduction (referred to herein as "VS-X") for non-ideally configured stereo rendering systems employing moderately to severely unmatched drivers, either by frequency response, output power, directionality, or any combination thereof.

In some embodiments, an audio processing system includes a crossover network, a high frequency processor, and a low frequency processor. The crossover network separates an input audio signal into a low frequency signal and a high frequency signal. The high frequency processor applies a subband spatial processing and b-chain processing to the high frequency signal to spatially enhance the input signal, and adjust the input signal for the unmatched speakers. The low frequency processor applies a parametric band-pass filter and a first gain to the low frequency signal to generate a low frequency resonator signal, and a second gain to the low frequency signal to generate a low frequency passthrough signal. A combiner generates an output signal by combining the low frequency output signal with one of a left channel of the high frequency output signal for the left speaker or a right channel of the high frequency output signal for the right speaker. For example, if the left speaker handles lower frequencies than the right speaker, then the low frequency output signal is provided to the left speaker. In another example, if the right speaker handles lower frequencies than the left speaker, then the low frequency output signal is provided to the right speaker.

Some embodiments include a non-transitory computer readable medium storing instructions that, when executed by a processor, configures the processor to: separate an input audio signal into a low frequency signal and a high frequency signal; apply a b-chain processing to the high frequency signal to adjust for an asymmetry between a left speaker and a right speaker to generate a high frequency output signal; apply a parametric band-pass filter and a first gain to the low frequency signal to generate a low frequency resonator signal; apply a second gain to the low frequency signal to generate a low frequency passthrough signal; generate a low frequency output signal by combining the low frequency resonator signal with the low frequency passthrough signal; and generate an output signal by combining the low frequency output signal with one of a left channel of the high frequency output signal for the left speaker or a right channel of the high frequency output signal for the right speaker.

Some embodiments include a method of processing an input audio signal. The method includes, by a computing system: separating the input audio signal into a low frequency signal and a high frequency signal; applying a b-chain processing to the high frequency signal to adjust for an asymmetry between a left speaker and a right speaker to generate a high frequency output signal; applying a parametric band-pass filter and a first gain to the low frequency signal to generate a low frequency resonator signal; applying a second gain to the low frequency signal to generate a low frequency passthrough signal; generating a low frequency output signal by combining the low frequency resonator signal with the low frequency passthrough signal; and generating an output signal by combining the low frequency output signal with one of a left channel of the high frequency output signal for the left speaker or a right channel of the high frequency output signal for the right speaker.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Overview

Example embodiments relate to providing a virtual stereo audio reproduction (referred to herein as "VS-X") for non-ideally configured stereo rendering systems employing moderately to severely unmatched drivers, such as by frequency response, output power, directionality, or any combination thereof. VS-X is an audio signal processing algorithm designed to restore and enhance the perceived spatial sound stage on such non-ideally configured stereo rendering systems. A primary role of the VS-X system is to address time alignment and frequency response asymmetries between loudspeakers in such a way as to create a stable non-spatial image (e.g. voice and bass guitar in a stereo mix), perceptually positioned at the ideal location directly in front of the listener's head. It also helps to create a stable and symmetric spatial image (e.g. balanced left/right components in a stereo mix, etc.). Further, by correcting the above asymmetries in the system, it provides the opportunity to apply increased immersion via sound stage enhancement techniques, such as subband spatial processing and crosstalk cancellation. The result of an optimally tuned VS-X system is an enhanced and spatially immersive transaural sound field, as perceived from the ideal listener "sweet spot."

Figure 1:
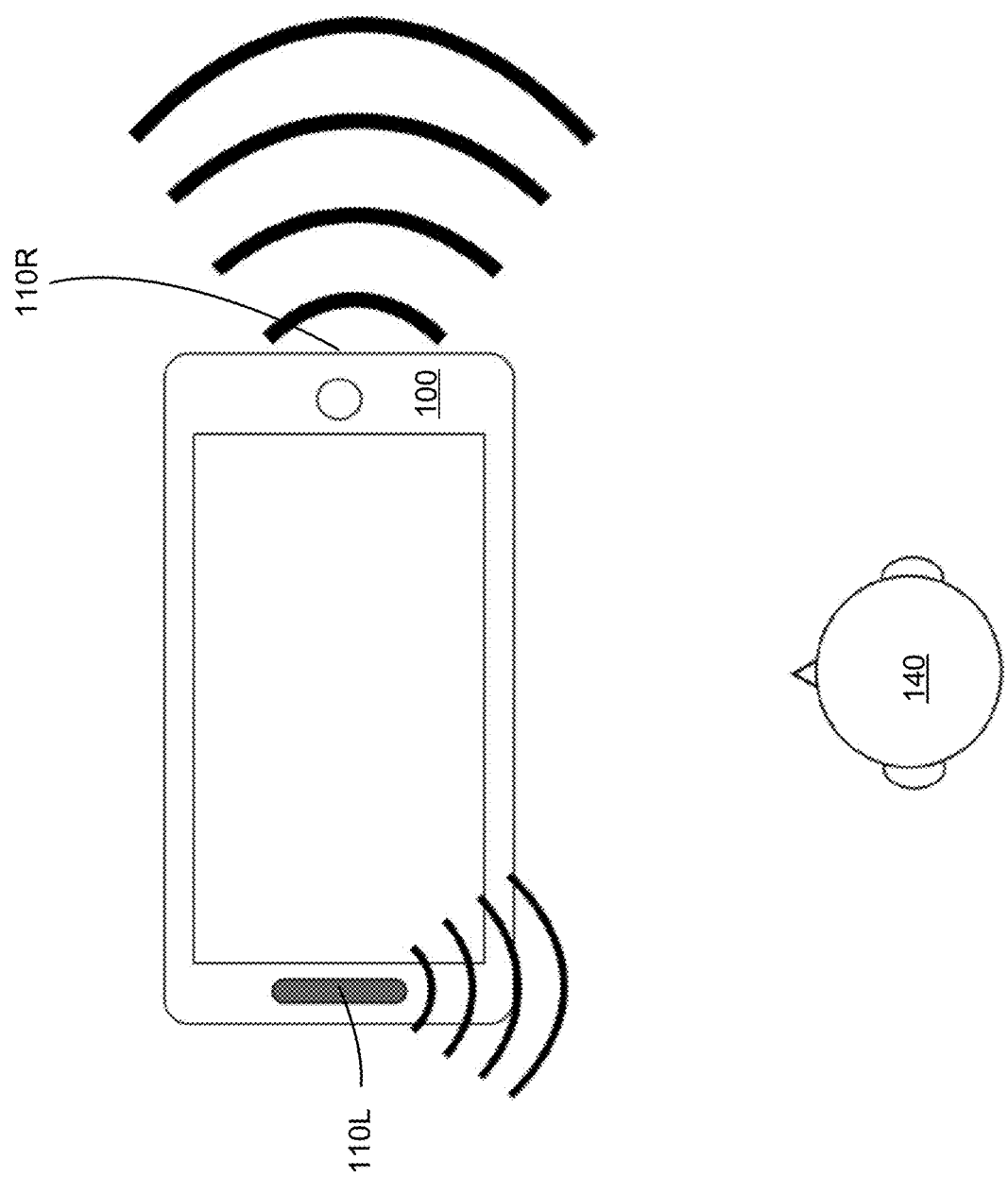
FIG. 1 is an example of a mobile device with non-ideal audio rendering, in accordance with some embodiments.

FIG. 1 is an example of a mobile device 100 with non-ideal audio rendering, in accordance with some embodiments. The mobile device 100 includes a left speaker 110L (or $110_L$) and a right speaker 110R (or $110_R$). The speakers 110L and 110R are mismatched. For instance, the speaker 110L may be an earpiece driver with significant low frequency attenuation below 1000 Hz. The speaker 110R may be a "broad-band" micro-loudspeaker capable of rendering low and mid-frequency energy below 550 to 1000 Hz. Furthermore, the speaker 110R has more output power than the speaker 110L, and is orthogonally firing with respect to the speaker 110L. The speakers 110L and 110R may be mismatched with respect to the listener 140 in terms of frequency response, output power, directionality, or any combination thereof.

Example Audio Processing System

Figure 2:
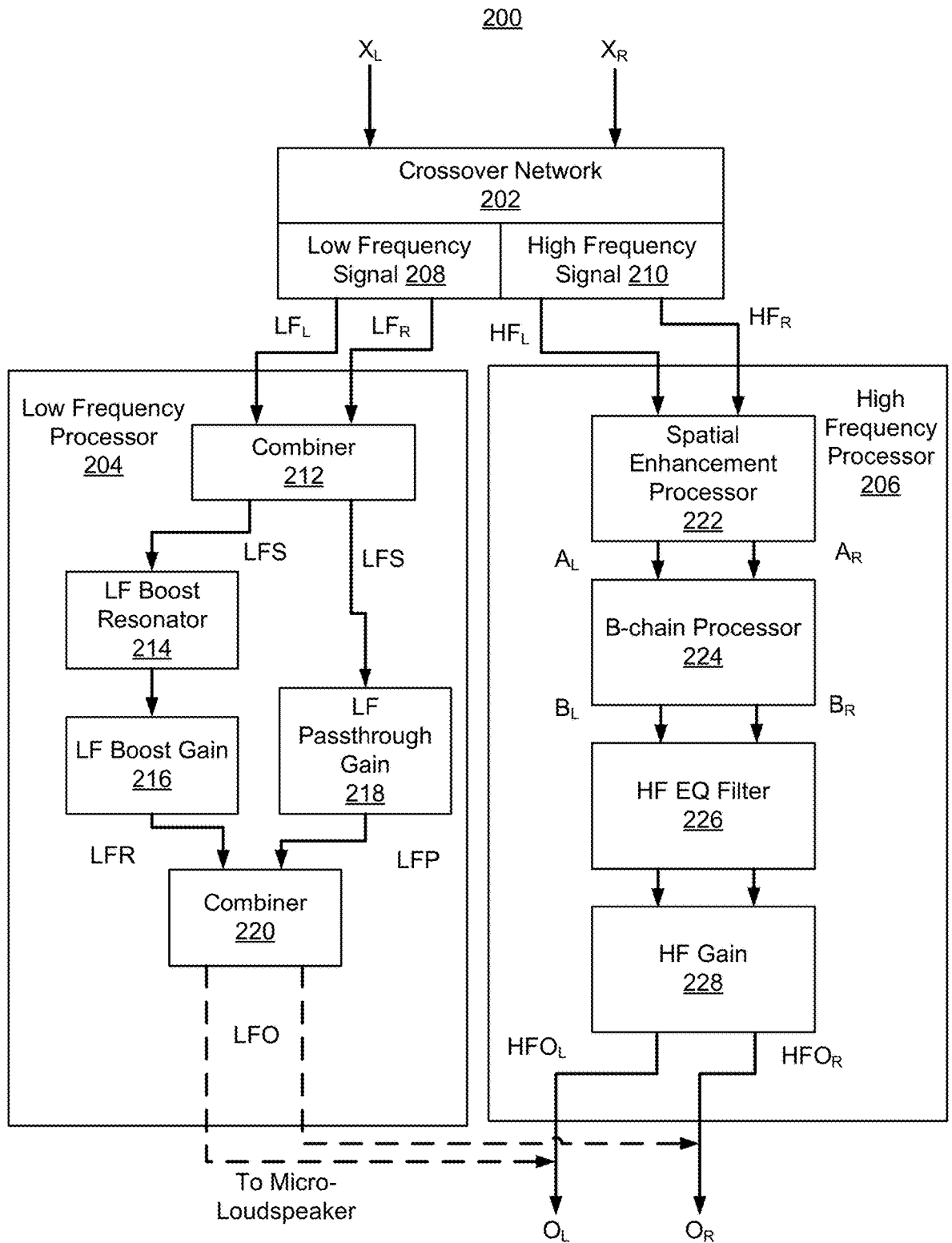
FIG. 2 is a schematic block diagram of an audio processing system, in accordance with some embodiments.

FIG. 2 is a schematic block diagram of an audio processing system 200, in accordance with some example embodiments. The audio processing system 200 compensates for mismatch between a left speaker 110L and a right speaker 110R in terms of frequency response, output power, directionality, or any combination thereof. The audio processing system 200 receives an input audio signal X including a left input channel XL (or $X_L$) and right input channel XR (or $X_R$), and generates an output audio signal O including a left output channel OL (or $O_L$) for the left speaker 110L and a right output channel OR (or $O_R$) for the right speaker 110R.

The audio processing system 200 includes a crossover network 202 that is coupled to a low frequency processor 204 and a high frequency processor 206. The crossover network 202 receives the left input channel XL and right input channel XR, and creates low frequency and high frequency channels. For example, the crossover network 202 includes filters that create low frequency (LF) channels including a left channel LFL (or $LF_L$) and a right channel LFR (or $LF_R$), and high frequency (HF) channels including a left channel HFL (or $HF_L$), and a right channel HFR (or $HF_R$). The left channel LFL is generated from the low frequency portions of the left input channel OL, and a right channel LFR is generated from the low frequency portions of the right input channel OR. The left channel LFL and the right channel LFR collectively form a low frequency signal 208. The left channel HFL and the right channel HFR collectively form a high frequency signal 210.

The low frequency signal 208 is processed by the low frequency processor 204, and the high frequency signal 210 is processed by the high frequency processor 206. As such, the audio processing system 200 treats the low frequency signal 208 independently from and in parallel to the counterpart high frequency signal 210.

Assuming the non-ideal nature of a given stereo audio system, the ability of the listener 140 to perceive the device 100 as rendering a spatially immersive sound field from the vantage of a "sweet spot" depends on the treatment of the mid and high frequency audio bands, where both speakers $110_L$ and $110_R$ can be employed in combination. To that end, the high frequency processor 206 performs subband spatial enhancement, b-chain processing, equalization filtering, and amplification on the high frequency signal 210.

The high frequency processor 206 includes a spatial enhancement processor 222, a b-chain processor 224, a high frequency (HF) equalization (EQ) filter 226, and a high frequency gain 228. The spatial enhancement processor 222 receives the left channel $HF_L$ and the right channel $HF_R$, and processes these channels to generate a spatially enhanced signal A including a left spatially enhanced channel $A_L$ and a right spatially enhanced channel $A_R$. In some embodiments, the spatial enhancement processor 222 applies a subband spatial processing that includes gain adjusting mid and side subband components of the high frequency signal 208 (including the left channel $HF_L$ and the right channel $HF_R$). The spatial enhancement processor 222 may further perform a crosstalk compensation and a crosstalk cancellation. Additional details regarding the spatial enhancement processor 222 are discussed below in connection with FIGS. 3, 4, 5 and 6.

The b-chain processor 224 is coupled to the spatial enhancement processor 222. "B-chain processing," as used herein, refers to processing of an audio signal that adjusts for mismatch of at least two speakers (e.g., left and right speakers) in terms of frequency response, output power, directionality, etc. The b-chain processor 224 adjusts for mismatch between the speakers $110_L$ and $110_R$. Among other things, the b-chain processor 224 can adjust for overall time delay difference between speakers $110_L$ and $110_R$ and the listener's head, signal level (perceived and objective) difference between the speakers $110_L$ and $110_R$ and the listener's head, and frequency response difference between the speakers $110_L$ and $110_R$ and the listener's head. The b-chain processor 224 receives the left spatially enhanced channel $A_L$ and a right spatially enhanced channel $A_R$, and adjusts for various mismatches between the speakers $110_L$ and $110_R$ to generate a left channel $B_L$ and a right channel $B_R$. Additional details regarding the b-chain processor 224 are discussed below in connection with FIG. 7.

The HF EQ filter 226 is coupled to the b-chain processor 224. The HF EQ filter 226 receives the left channel $B_L$ and a right channel $B_R$, and adjusts the relative level and frequency response of the left channel $B_L$ and the right channel $B_R$. The HF EQ filter 226 can be used to provide additional flexibility in balancing the mix between the high and low frequency signals. In some embodiments, the HF EQ filter 226 is omitted. In some embodiments, the functionality of the HF EQ filter 226 is integrated with the b-chain processor 224. For example, the N-band parametric EQ 702 may be configured to perform the functionality of the HF EQ filter 226.

The HF gain 228 is coupled to the HF EQ filter 226. The HF gain 228 receives the output of the HF EQ filter 226, and adjusts the overall signal level of the high frequency signal relative to the low frequency signal and its signal path through the low frequency processor 204. In some embodiments, different gains are applied to the left channel and the right channel of the high frequency signal by the HF gain 228. The output of the HF gain 228 represents the output of the high frequency processor 206, and includes a left high frequency output channel $HFO_L$ and a right high frequency output channel $HFO_R$. The left channel $HFO_L$ and the right channel $HFO_R$ represent a spatially-enhanced transaural image that is combined with the low frequency signal 208 subsequent to processing by the low frequency processor 204.

The low frequency processor 204 provides a stable non-spatial image (e.g., center-panned elements) and sufficient punch and body to the perceived overall sound field while avoiding excessive low frequency energy that may degrade and mask the effects of the spatially-enhanced transaural image. The low frequency processor 204 includes a combiner 212, a low frequency (LF) boost resonator 214, an LF boost gain 216, a LF passthrough gain 218, and a combiner 220. The combiner 212 is coupled to the crossover network 202 and receives the left channel $LF_L$ and the right channel $LF_R$. The combiner 212 is further coupled to the LF boost resonator 214 and the LF passthrough gain 218. The LF boost resonator 214 is coupled to the LF boost gain 216. The LF boost gain 216 and LF passthrough gain 218 are coupled to the combiner 220.

The combiner 212 combines the left channel $LF_L$ and the right channel $LF_R$ to generate the low frequency signal 208 (also shown as "LFS" in FIG. 2). In some embodiments, a phase adjustment such as polarity inversion, Hilbert transform, or Allpass filter, may be applied to the left channel $LF_L$ and the right channel $LF_R$ prior to combination by the combiner 212 to compensate for any phase shifts introduced by the filters in the crossover network 202.

Subsequent to the combination, the low frequency signal 208 is split into two parallel low frequency paths for processing: a resonator path including the LF boost resonator 214 and LF boost gain 216, and a passthrough path including the LF passthrough gain 218. The LF boost resonator 214 may be a parametric low-frequency band-pass filter, and the LF boost gain 216 applies a gain or attenuation on the output of the LF boost resonator 214. The resonator path enhances the bass in such a way that low/mid frequency transients in the mix (e.g., kick drum and bass guitar attacks) or other targeted parts of the low/mid frequency spectrum are made to perceptually stand out. The resonator path additionally may further condition the low frequency signal 208 to suit the frequency response characteristics of a given system's "broadband" micro-loudspeaker (e.g., speaker $110_R$), for optimal performance. The resonator path results in a low frequency resonator signal LFR.

In the passthrough path, the LF passthrough gain 218 attenuates the overall low frequency signal band enough to minimize negative impacts the non-enhanced low frequency signal 208 may have on the primarily mid and high frequency transaural sound field, while still providing enough broad low-frequency energy to prevent the stereo mix from sounding "anemic." The pass-through path results in a low frequency passthrough signal LFP.

The combiner 220 combines the low frequency resonator signal LFR and the low frequency passthrough signal LFP to generate a low frequency output signal LFO. For example, the combiner 220 sums the signals LFR and LFP to generate the signal LFO. The combiner 220 may be coupled to the micro-loudspeaker to route the signal LFO to the appropriate micro-loudspeaker capable of reproducing low frequency content.

With reference back to FIG. 1, for example, the speaker 110L may be an earpiece driver with significant low frequency attenuation below 1000 Hz, while the speaker 110R be the "broad-band" micro-loudspeaker capable of rendering low and mid-frequency energy down to 550 Hz. Here, the low frequency output signal LFO is routed to the micro-loud speaker 110R, and not the earpiece speaker 110L. The left high frequency output channel HFOL is transmitted to the left speaker 110L as the output channel OL. The right high frequency output channel HFOR is combined with the low frequency output signal LFO to generate an output channel OR, which is transmitted to the right speaker 110R. In an example where the speaker 110L handles lower frequencies than the speaker 110R, the low frequency output signal LFO may be routed to the speaker 110L instead of the speaker 110R.

Example Spatial Enhancement Processor

Figure 3:
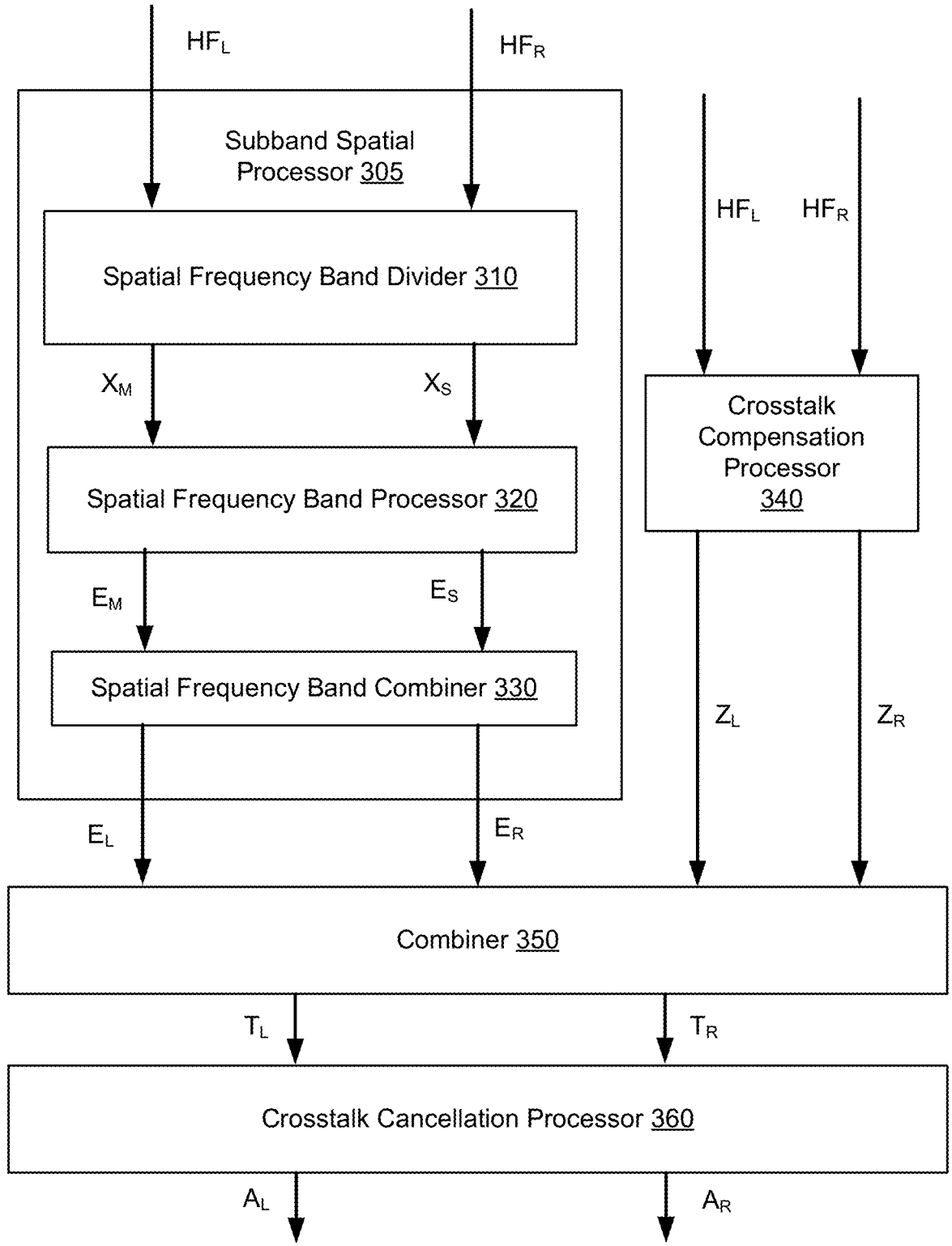
FIG. 3 is a schematic block diagram of a spatial enhancement processor, in accordance with some embodiments.

FIG. 3 is a schematic block diagram of a spatial enhancement processor 222, in accordance with some embodiments. The spatial enhancement processor 222 spatially enhances an input audio signal, and performing crosstalk cancellation on spatially enhanced audio signal. To that end, the spatial enhancement processor 222 receives the high frequency signal 210 including the left high frequency channel HFL and the right high frequency channel HFR.

The spatial enhancement processor 222 generates the spatially enhanced signal A including the left spatially enhanced channel $A_L$ and the right spatially enhanced channel $A_R$ by processing the input channels $HF_L$ and $HF_R$. The output audio signal A is a spatially enhanced audio signal of the high frequency signal 210 with crosstalk compensation and crosstalk cancellation. Although not shown in FIG. 3, the spatial enhancement processor 222 may further include an amplifier that amplifies the output audio signal A from the crosstalk cancellation processor 360, and provides the signal A to output devices, such as the loudspeakers $110_L$ and $110_R$, that convert the output channels $A_L$ and $A_R$ into sound.

The spatial enhancement processor 222 includes a subband spatial processor 305, a crosstalk compensation processor 340, a combiner 350, and a crosstalk cancellation processor 360. The spatial enhancement processor 222 performs crosstalk compensation and subband spatial processing of the input channels $HF_L$ and $HF_R$, combines the result of the subband spatial processing with the result of the crosstalk compensation, and then performs a crosstalk cancellation on the combined signals.

The subband spatial processor 305 includes a spatial frequency band divider 310, a spatial frequency band processor 320, and a spatial frequency band combiner 330. The spatial frequency band divider 310 is coupled to the input channels $HF_L$ and $HF_R$ and the spatial frequency band processor 320. The spatial frequency band divider 310 receives the left input channel $HF_L$ and the right input channel $HF_R$, and processes the input channels into a spatial (or "side") component $X_s$ and a nonspatial (or "mid") component $X_m$. For example, the spatial component $X_s$ can be generated based on a difference between the left input channel $HF_L$ and the right input channel $HF_R$. The nonspatial component $X_m$ can be generated based on a sum of the left input channel $HF_L$ and the right input channel $HF_R$. The spatial frequency band divider 310 provides the spatial component $X_s$ and the nonspatial component $X_m$ to the spatial frequency band processor 320.

The spatial frequency band processor 320 is coupled to the spatial frequency band divider 310 and the spatial frequency band combiner 330. The spatial frequency band processor 320 receives the spatial component $X_s$ and the nonspatial component $X_m$ from spatial frequency band divider 310, and enhances the received signals. In particular, the spatial frequency band processor 320 generates an enhanced spatial component $E_s$ from the spatial component $X_s$, and an enhanced nonspatial component $E_m$ from the nonspatial component $X_m$.

For example, the spatial frequency band processor 320 applies subband gains to the spatial component $X_s$ to generate the enhanced spatial component $E_s$, and applies subband gains to the nonspatial component $X_m$ to generate the enhanced nonspatial component $E_m$. In some embodiments, the spatial frequency band processor 320 additionally or alternatively provides subband delays to the spatial component $X_s$ to generate the enhanced spatial component $E_s$, and subband delays to the nonspatial component $X_m$ to generate the enhanced nonspatial component $E_m$. The subband gains and/or delays can be different for the different (e.g., n) subbands of the spatial component $X_s$ and the nonspatial component $X_m$, or can be the same (e.g., for two or more subbands). The spatial frequency band processor 320 adjusts the gain and/or delays for different subbands of the spatial component $X_s$ and the nonspatial component $X_m$ with respect to each other to generate the enhanced spatial component $E_s$ and the enhanced nonspatial component $E_m$. The spatial frequency band processor 320 then provides the enhanced spatial component $E_s$ and the enhanced nonspatial component $E_m$ to the spatial frequency band combiner 330.

The spatial frequency band combiner 330 is coupled to the spatial frequency band processor 320, and further coupled to the combiner 350. The spatial frequency band combiner 330 receives the enhanced spatial component Es and the enhanced nonspatial component Em from the spatial frequency band processor 320, and combines the enhanced spatial component Es and the enhanced nonspatial component Em into a left enhanced channel EL (or $E_L$) and a right enhanced channel ER (or $E_R$). For example, the left enhanced channel EL can be generated based on a sum of the enhanced spatial component Es and the enhanced nonspatial component Em, and the right enhanced channel ER can be generated based on a difference between the enhanced nonspatial component Em and the enhanced spatial component Es. The spatial frequency band combiner 330 provides the left enhanced channel EL and the right enhanced channel ER to the combiner 350.

The crosstalk compensation processor 340 performs a crosstalk compensation to compensate for spectral defects or artifacts in the crosstalk cancellation. The crosstalk compensation processor 340 receives the input channels HFL and HFR, and performs a processing to compensate for any artifacts in a subsequent crosstalk cancellation of the enhanced nonspatial component Em and the enhanced spatial component Es performed by the crosstalk cancellation processor 360. In some embodiments, the crosstalk compensation processor 340 may perform an enhancement on the nonspatial component Xm and the spatial component Xs by applying filters to generate a crosstalk compensation signal Z, including a left crosstalk compensation channel ZL (or $Z_L$) and a right crosstalk compensation channel ZR (or $Z_R$). In other embodiments, the crosstalk compensation processor 340 may perform an enhancement on only the nonspatial component Xm.

The combiner 350 combines the left enhanced channel EL with the left crosstalk compensation channel ZL to generate a left enhanced compensation channel TL (or $T_L$), and combines the right enhanced channel ER with the right crosstalk compensation channel ZR to generate a right enhanced compensation channel TR (or $T_R$). The combiner 350 is coupled to the crosstalk cancellation processor 360, and provides the left enhanced compensation channel TL and the right enhanced compensation channel TR to the crosstalk cancellation processor 360.

The crosstalk cancellation processor 360 receives the left enhanced compensation channel TL and the right enhanced compensation channel TR, and performs crosstalk cancellation on the channels TL, TR to generate the spatially enhanced signal A including the left spatially enhanced channel AL (or $A_L$) and the right spatially enhanced channel AR (or $A_R$).

Additional details regarding the subband spatial processor 305 are discussed below in connection with FIG. 4, additional details regarding the crosstalk compensation processor 340 are discussed below in connection with FIG. 5, and additional details regarding the crosstalk cancellation processor 360 are discussed below in connection with FIG. 6.

Figure 4:
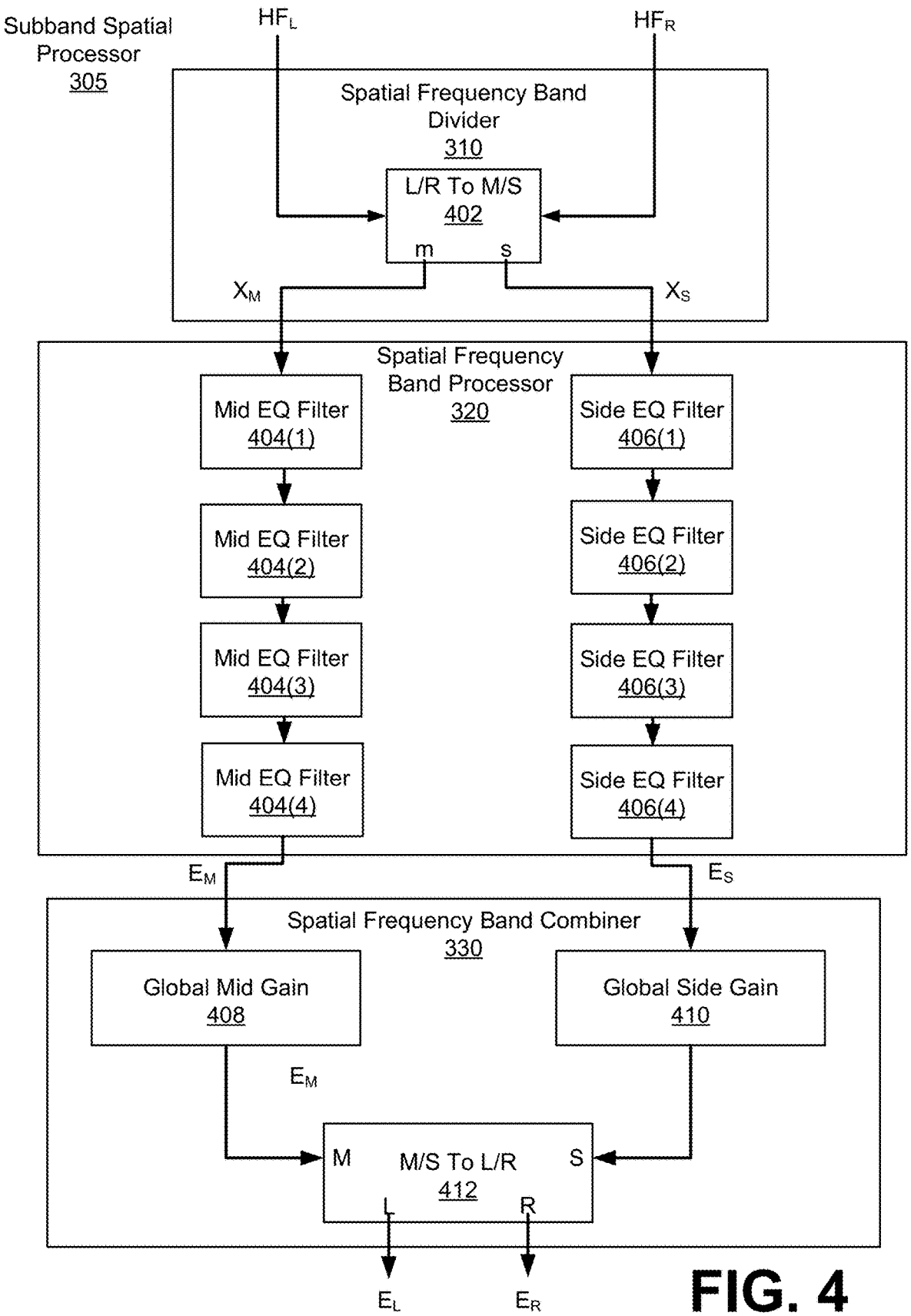
FIG. 4 is a schematic block diagram of a subband spatial processor, in accordance with some embodiments.

FIG. 4 is a schematic block diagram of a subband spatial processor 305, in accordance with some embodiments. The subband spatial processor 305 includes the spatial frequency band divider 310, the spatial frequency band processor 320, and the spatial frequency band combiner 330. The spatial frequency band divider 310 is coupled to the spatial frequency band processor 320, and the spatial frequency band processor 320 is coupled to the spatial frequency band combiner 330.

The spatial frequency band divider 310 includes an L/R to M/S converter 402 that receives the left input channel HFL and a right input channel HFR, and converts these inputs into the spatial component $X_s$ and the nonspatial component $X_m$. The spatial component Xs may be generated by subtracting the left input channel XL and right input channel XR. The nonspatial component Xm may be generated by adding the left input channel XL and the right input channel XR.

The spatial frequency band processor 320 receives the nonspatial component Xm and applies a set of subband filters to generate the enhanced nonspatial subband component Em. The spatial frequency band processor 320 also receives the spatial subband component Xs and applies a set of subband filters to generate the enhanced nonspatial subband component Em. The subband filters can include various combinations of peak filters, notch filters, low pass filters, high pass filters, low shelf filters, high shelf filters, bandpass filters, bandstop filters, and/or all pass filters.

In some embodiments, the spatial frequency band processor 320 includes a subband filter for each of n frequency subbands of the nonspatial component Xm and a subband filter for each of the n frequency subbands of the spatial component Xs. For n=4 subbands, for example, the spatial frequency band processor 320 includes a series of subband filters for the nonspatial component Xm including a mid-equalization (EQ) filter 404(1) for the subband (1), a mid EQ filter 404(2) for the subband (2), a mid EQ filter 404(3) for the subband (3), and a mid EQ filter 404(4) for the subband (4). Each mid EQ filter 404 applies a filter to a frequency subband portion of the nonspatial component Xm to generate the enhanced nonspatial component Em.

The spatial frequency band processor 320 further includes a series of subband filters for the frequency subbands of the spatial component Xs, including a side equalization (EQ) filter 406(1) for the subband (1), a side EQ filter 406(2) for the subband (2), a side EQ filter 406(3) for the subband (3), and a side EQ filter 406(4) for the subband (4). Each side EQ filter 406 applies a filter to a frequency subband portion of the spatial component Xs to generate the enhanced spatial component Es.

Each of the n frequency subbands of the nonspatial component Xm and the spatial component Xs may correspond with a range of frequencies. For example, the frequency subband (1) may corresponding to 0 to 300 Hz, the frequency subband (2) may correspond to 300 to 510 Hz, the frequency subband (3) may correspond to 510 to 2700 Hz, and the frequency subband (4) may correspond to 2700 Hz to Nyquist frequency. In some embodiments, the n frequency subbands are a consolidated set of critical bands. The critical bands may be determined using a corpus of audio samples from a wide variety of musical genres. A long term average energy ratio of mid to side components over the 24 Bark scale critical bands is determined from the samples. Contiguous frequency bands with similar long term average ratios are then grouped together to form the set of critical bands. The range of the frequency subbands, as well as the number of frequency subbands, may be adjustable.

In some embodiments, the mid EQ filters 404 or side EQ filters 406 may include a biquad filter, having a transfer function defined by Equation 1:

$$H(z) = \frac{b_0 + b_1 z^{-1} + b_2 z^{-2}}{a_0 + a_1 z^{-1} + a_2 z^{-2}} \quad \text{Eq. (1)}$$

where z is a complex variable. The filter may be implemented using a direct form I topology as defined by Equation 2:

$$Y[n] = \frac{b_0}{a_0} X[n-1] + \frac{b_1}{a_0} X[n-1] + \frac{b_2}{a_0} X[n-2] - \frac{a_1}{a_0} Y[n-1] - \frac{a_2}{a_0} Y[n-2] \quad \text{Eq. (2)}$$

where X is the input vector, and Y is the output. Other topologies might have benefits for certain processors, depending on their maximum word-length and saturation behaviors.

The biquad can then be used to implement any second-order filter with real-valued inputs and outputs. To design a discrete-time filter, a continuous-time filter is designed and transformed it into discrete time via a bilinear transform. Furthermore, compensation for any resulting shifts in center frequency and bandwidth may be achieved using frequency warping.

For example, a peaking filter may include an S-plane transfer function defined by Equation 3:

$$H(s) = \frac{s^2 + s(A/Q) + 1}{s^2 + s(A/Q) + 1} \quad \text{Eq. (3)}$$

where s is a complex variable, A is the amplitude of the peak, and Q is the filter "quality" (canonically derived as:

$\left(\text{canonically derived as: } Q = \frac{f_c}{\Delta f}\right)$.

The digital filters coefficients are:

$b_0 = 1 + \alpha A$ $b_1 = -2 * \cos(\omega_0)$ $b_2 = 1 - \alpha A$ $a_0 = 1 + \frac{\alpha}{A}$ $a_1 = -2\cos(\omega_0)$ $a_2 = 1 + \frac{\alpha}{A}$ where $\omega_0$ is the center frequency of the filter in radians and $$\alpha = \frac{\sin(\omega_0)}{2Q}.$$

The spatial frequency band combiner 330 receives mid and side components, applies gains to each of the components, and converts the mid and side components into left and right channels. For example, the spatial frequency band combiner 330 receives the enhanced nonspatial component Em and the enhanced spatial component Es, and performs global mid and side gains before converting the enhanced nonspatial component Em and the enhanced spatial component Es into the left spatially enhanced channel EL and the right spatially enhanced channel ER.

More specifically, the spatial frequency band combiner 330 includes a global mid gain 408, a global side gain 410, and an M/S to L/R converter 412 coupled to the global mid gain 408 and the global side gain 410. The global mid gain 408 receives the enhanced nonspatial component Em and applies a gain, and the global side gain 410 receives the enhanced spatial component Es and applies a gain. The M/S to L/R converter 412 receives the enhanced nonspatial component Em from the global mid gain 408 and the enhanced spatial component Es from the global side gain 410, and converts these inputs into the left enhanced channel EL and the right enhanced channel ER.

Figure 5:
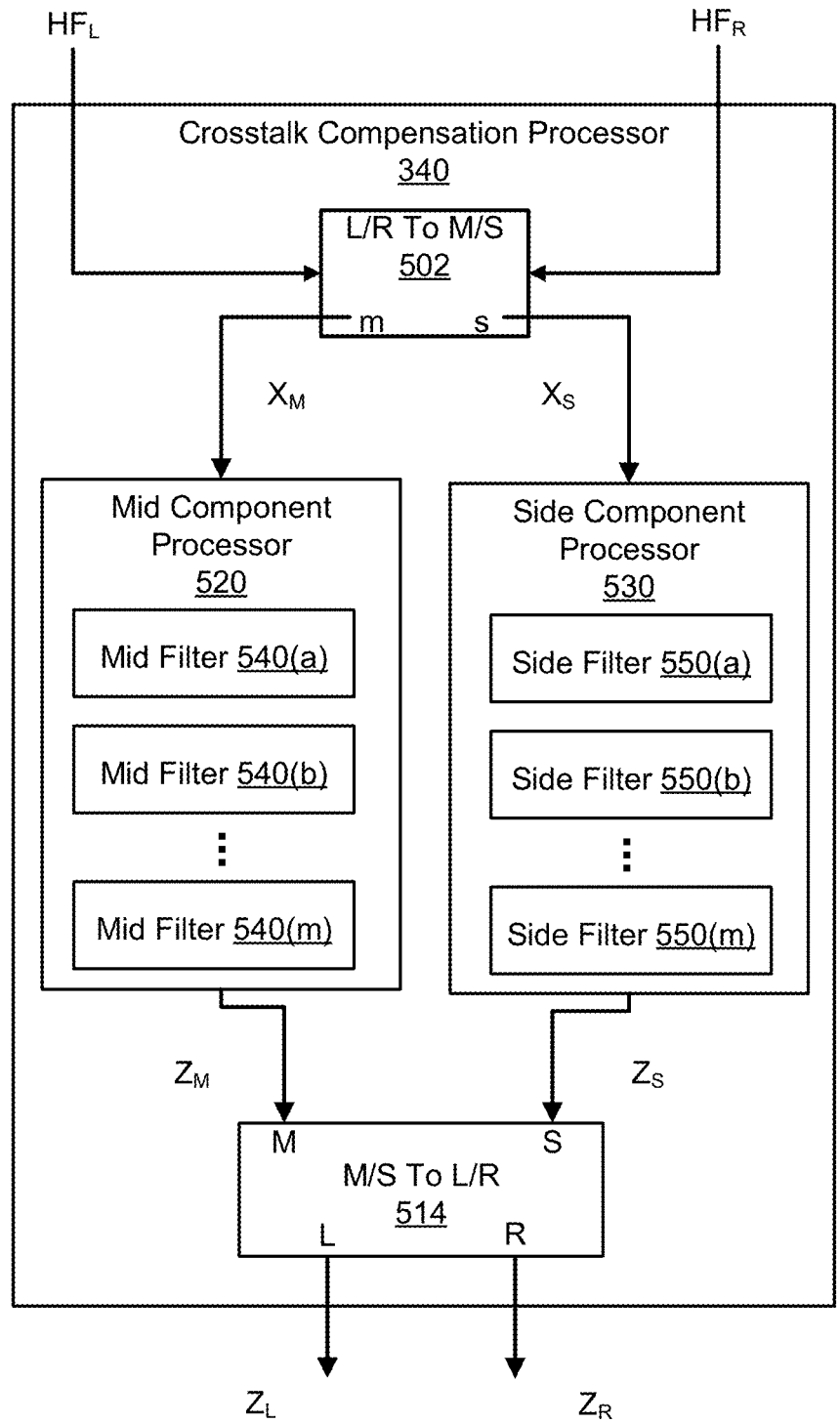
FIG. 5 is a schematic block diagram of a crosstalk compensation processor, in accordance with some embodiments.

FIG. 5 is a schematic block diagram of a crosstalk compensation processor 340, in accordance with some embodiments. The crosstalk compensation processor 340 receives left and right input channels HFL and HFR, and generates left and right output channels by applying a crosstalk compensation on the input channels. The crosstalk compensation processor 340 includes a L/R to M/S converter 502, a mid-component processor 520, a side component processor 530, and an M/S to L/R converter 514.

The crosstalk compensation processor 340 receives the input channels HFL and HFR, and performs a preprocessing to generate the left crosstalk compensation channel ZL and the right crosstalk compensation channel ZR. The channels ZL, ZR may be used to compensate for any artifacts in crosstalk processing, such as crosstalk cancellation or simulation. The L/R to M/S converter 502 receives the left channel HFL and the right channel HFR, and generates the nonspatial component Xm and the spatial component Xs of the input channels XL, XR. The left and right channels may be summed to generate the nonspatial component of the left and right channels, and subtracted to generate the spatial component of the left and right channels.

The mid component processor 520 includes a plurality of filters 540, such as m mid filters 540(a), 540(b), through 540(m). Here, each of the m mid filters 540 processes one of m frequency bands of the nonspatial component Xm and the spatial component Xs. The mid component processor 520 generates a mid-crosstalk compensation channel Zm by processing the nonspatial component Xm. In some embodiments, the mid filters 540 are configured using a frequency response plot of the nonspatial component Xm with crosstalk processing through simulation. In addition, by analyzing the frequency response plot, any spectral defects such as peaks or troughs in the frequency response plot over a predetermined threshold (e.g., 10 dB) occurring as an artifact of the crosstalk processing can be estimated. These artifacts result primarily from the summation of the delayed and inverted contralateral signals with their corresponding ipsilateral signal in the crosstalk processing, thereby effectively introducing a comb filter-like frequency response to the final rendered result. The mid crosstalk compensation channel Zm can be generated by the mid component processor 520 to compensate for the estimated peaks or troughs, where each of the m frequency bands corresponds with a peak or trough. Specifically, based on the specific delay, filtering frequency, and gain applied in the crosstalk processing, peaks and troughs shift up and down in the frequency response, causing variable amplification and/or attenuation of energy in specific regions of the spectrum. Each of the mid filters 540 may be configured to adjust for one or more of the peaks and troughs.

The side component processor 530 includes a plurality of filters 550, such as m side filters 550(a), 550(b) through 550(m). The side component processor 530 generates a side crosstalk compensation channel Zs by processing the spatial component Xs. In some embodiments, a frequency response plot of the spatial component Xs with crosstalk processing can be obtained through simulation. By analyzing the frequency response plot, any spectral defects such as peaks or troughs in the frequency response plot over a predetermined threshold (e.g., 10 dB) occurring as an artifact of the crosstalk processing can be estimated. The side crosstalk compensation channel Zs can be generated by the side component processor 530 to compensate for the estimated peaks or troughs. Specifically, based on the specific delay, filtering frequency, and gain applied in the crosstalk processing, peaks and troughs shift up and down in the frequency response, causing variable amplification and/or attenuation of energy in specific regions of the spectrum. Each of the side filters 550 may be configured to adjust for one or more of the peaks and troughs. In some embodiments, the mid component processor 520 and the side component processor 530 may include a different number of filters.

In some embodiments, the mid filters 540 and side filters 550 may include a biquad filter having a transfer function defined by Equation 4:

$$H(z) = \frac{b_0 + b_1 z^{-1} + b_2 z^{-2}}{a_0 + a_1 z^{-1} + a_2 z^{-2}} \quad \text{Eq. (4)}$$

where z is a complex variable, and $a_0$, $a_1$, $a_2$, $b_0$, $b_1$, and $b_2$ are digital filter coefficients. One way to implement such a filter is the direct form I topology as defined by Equation 5:

$$Y[n] = \frac{b_0}{a_0} X[n-1] + \frac{b_1}{a_0} X[n-1] + \frac{b_2}{a_0} X[n-2] - \frac{a_1}{a_0} Y[n-1] - \frac{a_2}{a_0} Y[n-2] \quad \text{Eq. (5)}$$

where X is the input vector, and Y is the output. Other topologies may be used, depending on their maximum word-length and saturation behaviors.

The biquad can then be used to implement a second-order filter with real-valued inputs and outputs. To design a discrete-time filter, a continuous-time filter is designed, and then transformed into discrete time via a bilinear transform. Furthermore, resulting shifts in center frequency and bandwidth may be compensated using frequency warping.

For example, a peaking filter may have an S-plane transfer function defined by Equation 6:

$$H(s) = \frac{s^2 + s(A/Q) + 1}{s^2 + s(A/Q) + 1} \quad \text{Eq. (6)}$$

where s is a complex variable, A is the amplitude of the peak, and Q is the filter "quality," and the digital filter coefficients are defined by:

$$b_0 = 1 + \alpha A$$
$$b_1 = -2 * \cos(\omega_0)$$
$$b_2 = 1 - \alpha A$$
$$a_0 = 1 + \frac{\alpha}{A}$$
$$a_1 = -2\cos(\omega_0)$$
$$a_2 = 1 + \frac{\alpha}{A}$$

where $\omega_0$ is the center frequency of the filter in radians and $$\alpha = \frac{\sin(\omega_0)}{2Q}.$$

Furthermore, the filter quality Q may be defined by Equation 7:

$$Q = \frac{f_c}{\Delta f} \quad \text{Eq. (7)}$$

where $\Delta f$ is a bandwidth and $f_c$ is a center frequency.

The M/S to L/R converter 514 receives the mid crosstalk compensation channel Zm (or $Z_m$) and the side crosstalk compensation channel Zs (or $Z_s$), and generates the left crosstalk compensation channel ZL (or $Z_L$) and the right crosstalk compensation channel ZR (or $Z_R$). In general, the mid and side channels may be summed to generate the left channel of the mid and side components, and the mid and side channels may be subtracted to generate right channel of the mid and side components.

Figure 6:
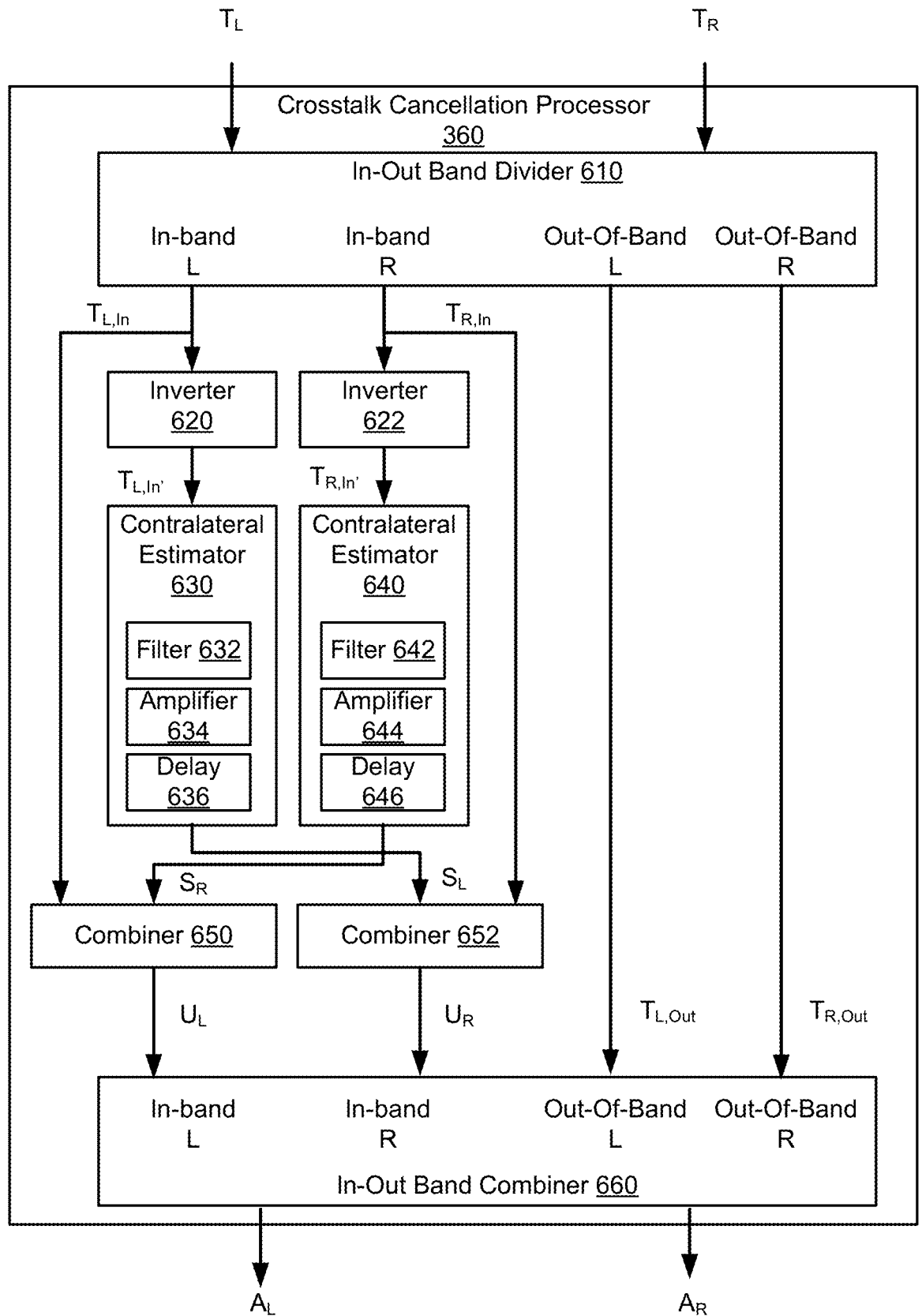
FIG. 6 is a schematic block diagram of a crosstalk cancellation processor, in accordance with some embodiments.

FIG. 6 is a schematic block diagram of a crosstalk cancellation processor 360, in accordance with some embodiments. The crosstalk cancellation processor 360 receives the left enhanced compensation channel TL (or $T_L$) and the right enhanced compensation channel TR (or $T_R$) from the combiner 350, and performs crosstalk cancellation on the channels TL, TR to generate the left output channel AL (or $A_L$), and the right output channel AR (or $A_R$).

The crosstalk cancellation processor 360 includes an in-out band divider 610, inverters 620 and 622, contralateral estimators 630 and 640, combiners 650 and 652, and an in-out band combiner 660. These components operate together to divide the input channels TL, TR into in-band components and out-of-band components, and perform a crosstalk cancellation on the in-band components to generate the output channels AL, AR.

By dividing the input audio signal T into different frequency band components and by performing crosstalk cancellation on selective components (e.g., in-band components), crosstalk cancellation can be performed for a particular frequency band while obviating degradations in other frequency bands. If crosstalk cancellation is performed without dividing the input audio signal T into different frequency bands, the audio signal after such crosstalk cancellation may exhibit significant attenuation or amplification in the nonspatial and spatial components in low frequency (e.g., below 350 Hz), higher frequency (e.g., above 12000 Hz), or both. By selectively performing crosstalk cancellation for the in-band (e.g., between 250 Hz and 14000 Hz), where the vast majority of impactful spatial cues reside, a balanced overall energy, particularly in the nonspatial component, across the spectrum in the mix can be retained.

The in-out band divider 610 separates the input channels TL, TR into in-band channels TL,In, TR,In (or $T_{L,In}$, $T_{R,In}$) and out of band channels TL,Out, TR,Out (or $T_{L,Out}$, $T_{R,Out}$), respectively. Particularly, the in-out band divider 610 divides the left enhanced compensation channel TL into a left in-band channel TL,In and a left out-of-band channel TL,Out. Similarly, the in-out band divider 610 separates the right enhanced compensation channel TR into a right in-band channel TR,In and a right out-of-band channel TR,Out. Each in-band channel may encompass a portion of a respective input channel corresponding to a frequency range including, for example, 250 Hz to 14 kHz. The range of frequency bands may be adjustable, for example according to speaker parameters.

The inverter 620 and the contralateral estimator 630 operate together to generate a left contralateral cancellation component SL to compensate for a contralateral sound component due to the left in-band channel TL,In. Similarly, the inverter 622 and the contralateral estimator 640 operate together to generate a right contralateral cancellation component SR to compensate for a contralateral sound component due to the right in-band channel TR,In.

In one approach, the inverter 620 receives the in-band channel TL,In and inverts a polarity of the received in-band channel TL,In to generate an inverted in-band channel TL,In'. The contralateral estimator 630 receives the inverted in-band channel TL,In' (or $T_{L,In}'$), and extracts a portion of the inverted in-band channel TL,In' corresponding to a contralateral sound component through filtering. Because the filtering is performed on the inverted in-band channel TL,In', the portion extracted by the contralateral estimator 630 becomes an inverse of a portion of the in-band channel TL,In attributing to the contralateral sound component. Hence, the portion extracted by the contralateral estimator 630 becomes a left contralateral cancellation component SL, which can be added to a counterpart in-band channel TR,In to reduce the contralateral sound component due to the in-band channel TL,In. In some embodiments, the inverter 620 and the contralateral estimator 630 are implemented in a different sequence.

The inverter 622 and the contralateral estimator 640 perform similar operations with respect to the in-band channel TR,In to generate the right contralateral cancellation component SR. Therefore, detailed description thereof is omitted herein for the sake of brevity.

In one example implementation, the contralateral estimator 630 includes a filter 632, an amplifier 634, and a delay unit 636. The filter 632 receives the inverted input channel TL,In' and extracts a portion of the inverted in-band channel TL,In' corresponding to a contralateral sound component through a filtering function. An example filter implementation is a Notch or Highshelf filter with a center frequency selected between 5000 and 10000 Hz, and Q selected between 0.5 and 1.0. Gain in decibels (GdB) may be derived from Equation 8:

$$G_{dB} = -3.0 - \log_{1.333}(D) \quad \text{Eq. (8)}$$

where D is a delay amount by delay unit 636 in samples, for example, at a sampling rate of 48 KHz. An alternate implementation is a Lowpass filter with a corner frequency selected between 5000 and 10000 Hz, and Q selected between 0.5 and 1.0. Moreover, the amplifier 634 amplifies the extracted portion by a corresponding gain coefficient $G_{L,In}$, and the delay unit 636 delays the amplified output from the amplifier 634 according to a delay function D to generate the left contralateral cancellation component $S_L$. The contralateral estimator 640 includes a filter 642, an amplifier 644, and a delay unit 646 that performs similar operations on the inverted in-band channel $T_{R,In}'$ to generate the right contralateral cancellation component $S_R$. In one example, the contralateral estimators 630, 640 generate the left and right contralateral cancellation components $S_L$, $S_R$, according to equations below:

$$S_L = D[G_{L,In} * F[T_{L,In}']] \quad \text{Eq. (9)}$$

$$S_R = D[G_{R,In} * F[T_{R,In}']] \quad \text{Eq. (10)}$$

where F[ ] is a filter function, and D[ ] is the delay function.

The configurations of the crosstalk cancellation can be determined by the speaker parameters. In one example, filter center frequency, delay amount, amplifier gain, and filter gain can be determined, according to an angle formed between two speakers 110L and 110R with respect to a listener. In some embodiments, values between the speaker angles are used to interpolate other values.

The combiner 650 combines the right contralateral cancellation component SR to the left in-band channel TL,In to generate a left in-band compensation channel UL, and the combiner 652 combines the left contralateral cancellation component SL to the right in-band channel TR,In to generate a right in-band compensation channel UR. The in-out band combiner 660 combines the left in-band compensation channel UL with the out-of-band channel TL,Out to generate the left output channel AL, and combines the right in-band compensation channel UR with the out-of-band channel TR,Out to generate the right output channel AR.

Accordingly, the left output channel AL includes the right contralateral cancellation component SR corresponding to an inverse of a portion of the in-band channel TR,In attributing to the contralateral sound, and the right output channel AR includes the left contralateral cancellation component SL corresponding to an inverse of a portion of the in-band channel TL,In attributing to the contralateral sound. In this configuration, a wavefront of an ipsilateral sound component output by the speaker 110R according to the right output channel AR arrived at the right ear can cancel a wavefront of a contralateral sound component output by the loudspeaker 110L according to the left output channel AL. Similarly, a wavefront of an ipsilateral sound component output by the speaker 110L according to the left output channel AL arrived at the left ear can cancel a wavefront of a contralateral sound component output by the speaker 110R according to right output channel AR. Thus, contralateral sound components can be reduced to enhance spatial detectability.

Additional details regarding subband spatial processing and crosstalk cancellation are discussed in U.S. patent application Ser. No. 15/409,278, filed Jan. 18, 2017, U.S. patent application Ser. No. 15/404,948, filed Jan. 12, 2017, and U.S. patent Ser. No. 15/646,821, filed Jul. 11, 2017, each incorporated by reference in its entirety.

B-Chain Processor

Figure 7:
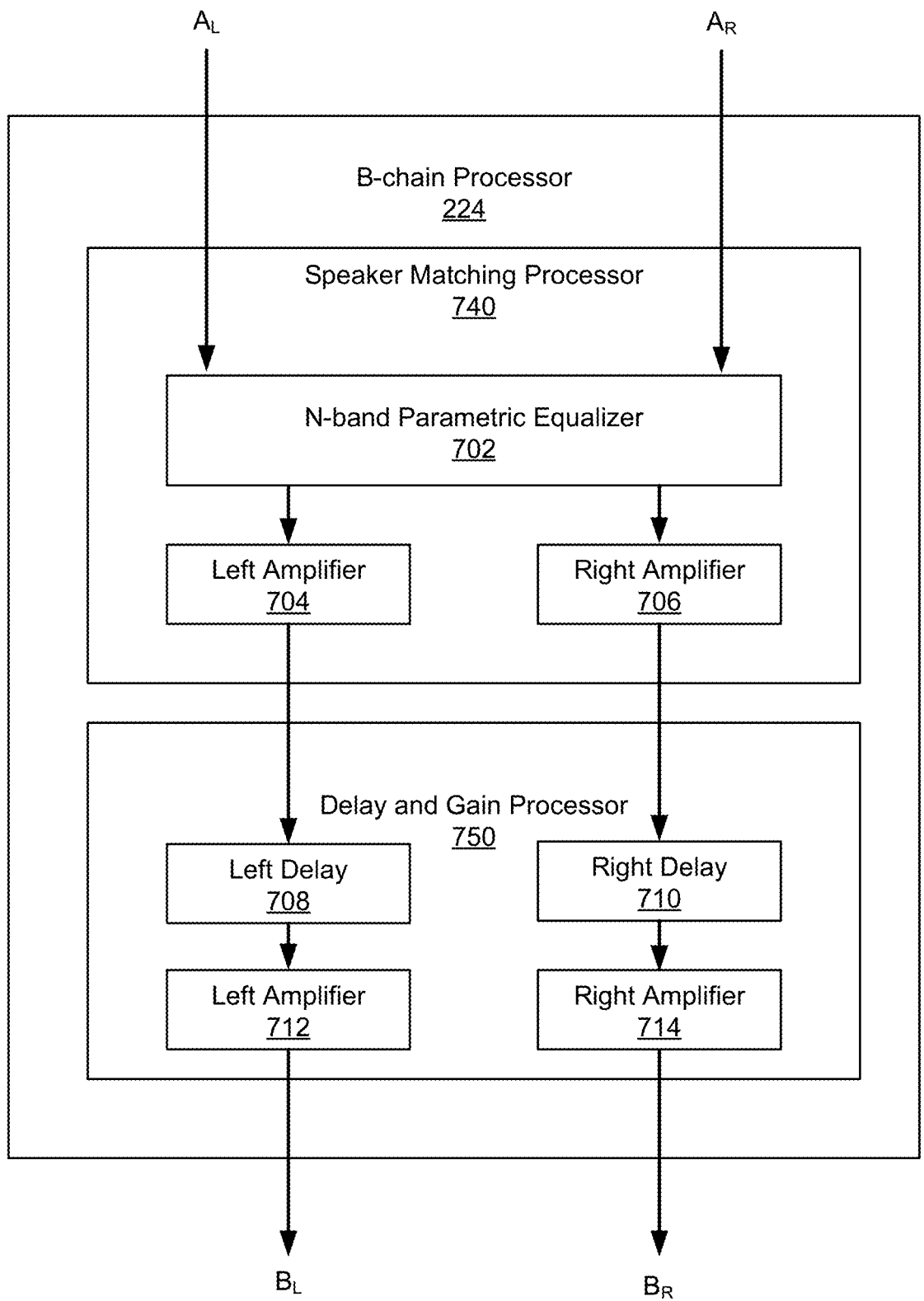
FIG. 7 is a schematic block diagram of a b-chain processor, in accordance with some embodiments.

FIG. 7 is a schematic block diagram of a b-chain processor 224, in accordance with some embodiments. The b-chain processor 224 includes the speaker matching processor 740 and the delay and gain processor 750. The speaker matching processor 250 includes an N-band equalizer (EQ) 702 coupled to a left amplifier 704 and a right amplifier 706. The delay and gain processor 750 includes a left delay 708 coupled to a left amplifier 712, and a right delay 710 coupled to a right amplifier 714.

With reference to FIG. 1, assuming the orientation of the listener 140 remains fixed towards the center of an ideal spatial image generated by the speakers $110_L$ and $110_R$ (e.g., the virtual lateral center of the sound stage, given symmetric, matched, and equidistant loudspeakers), the transformational relationship between the ideal and real rendered spatial image can be described based on (a) overall time delay between one speaker and the listener 140 being different from that of another speaker, (b) signal level (perceived and objective) between one speaker and the listener 140 being different from that of another speaker, and (c) frequency response between one speaker and the listener 140 being different from that of another speaker.

The b-chain processor 224 corrects the above relative differences in delay, signal level, and frequency response, resulting in a restored near-ideal spatial image, as if the listener 140 (e.g., head position) and/or rendering system were ideally configured.

Returning to FIG. 7, the b-chain processor 224 receives as input the audio signal A including the left enhanced channel AL and the right enhanced channel AR from the spatial enhancement processor 222. If the audio signal A has no spatial asymmetries and if no other irregularities exist in the system, the spatial enhancement processor 222 provides a dramatically enhanced sound stage for the listener 140. However, if asymmetries do exist in the system, as illustrated by the mismatched speakers 110L and 110R in FIG. 1, the b-chain processor 224 may be applied to retain the enhanced sound stage under non-ideal conditions.

Whereas the ideal listener/speaker configuration includes a pair of loudspeakers with matching left and right speaker-to-head distances, many real-world setups do not meet these criteria, resulting in a compromised stereo listening experience. Mobile devices, for example, may include a front facing earpiece loudspeaker with limited bandwidth (e.g. 1000-8000 Hz frequency response), and an orthogonally (down or side-ward) facing micro-loudspeaker (e.g., 200-20000 Hz frequency response). Here, the speaker system is unmatched in a two-fold manner, with audio driver performance characteristics (e.g., signal level, frequency response, etc.) being different, and time alignment relative to the "ideal" listener position being unmatched because the non-parallel orientation of the speakers. Another example is where a listener using a stereo desktop loudspeaker system does not arrange either the loudspeakers or themselves in the ideal configuration. The b-chain processor 224 thus provides for tuning of the characteristics of each channel, addressing associated system-specific asymmetries, resulting in a more perceptually compelling transaural sound stage.

After spatial enhancement processing or some other processing has been applied to the stereo input signal X, tuned under the assumption of an ideally configured system (i.e. listener in sweet spot, matched, symmetrically placed loudspeakers, etc.), the speaker matching processor 740 provides practical loudspeaker balancing for devices that do not provide matched speaker pairs, as is the case in the vast majority of mobile devices. The N-band parametric EQ 702 of the speaker matching processor 740 receives the left enhanced channel $A_L$ and the right enhanced channel $A_R$, and applies an equalization to each of the channels $A_L$ and $A_R$.

In some embodiments, the N-band EQ 702 provides various EQ filter types such as a low and high-shelf filter, a band-pass filter, a band-stop filter, and peak-notch filter, or low and high pass filter. If one loudspeaker in a stereo pair is angled away from the ideal listener sweet spot, for example, that loudspeaker will exhibit noticeable high-frequency attenuation from the listener sweet spot. One or more bands of the N-band EQ 702 can be applied on that loudspeaker channel in order to restore the high frequency energy when observed from the sweet spot (e.g., via high-shelf filter), achieving a near-match to the characteristics of the other forward facing loudspeaker. In another scenario, if both loudspeakers are front-facing but one of them has a vastly different frequency response, then EQ tuning can be applied to both left and right channels to strike a spectral balance between the two. Applying such tunings can be equivalent to "rotating" the loudspeaker of interest to match the orientation of the other, forward-facing loudspeaker. In some embodiments, the N-band EQ 702 includes a filter for each of n bands that are processed independently. The number of bands may vary. In some embodiments, the number of bands correspond with the subbands of the subband spatial processing.

In some embodiments, speaker asymmetry may be predefined for a particular set of speakers, with the known asymmetry being used as a basis for selecting parameters of the N-band EQ 702. In another example, speaker asymmetry may be determined based on testing the speakers, such as by using test audio signals, recording the sound generated from the signals by the speakers, and analyzing the recorded sound.

The left amplifier 704 is coupled to the N-band EQ 702 to receive a left channel and the right amplifier 706 is coupled to the N-band EQ 702 to receive a right channel. The amplifiers 704 and 706 address asymmetries in loudspeaker loudness and dynamic range capabilities by adjusting the output gains on one or both channels. This is especially useful for balancing any loudness offsets in loudspeaker distances from the listening position, and for balancing unmatched loudspeaker pair that have vastly different sound pressure level (SPL) output characteristics.

The delay and gain processor 750 receives left and right output channels of the speaker matching processor 740, and applies a time delay and gain or attenuation to one or more of the channels. To that end, the delay and gain processor 750 includes the left delay 708 that receives the left channel output from the speaker matching processor 740 and applies a time delay, and the left amplifier 712 that applies a gain or attenuation to the left channel to generate the left output channel BL. The delay and gain processor 750 further includes the right delay 710 that receives the right channel output from the speaker matching processor 740, and applies a time delay, and the right amplifier 714 that applies a gain or attenuation to the right channel to generate the right output channel BR. As discussed above, the speaker matching processor 740 perceptually balances the left/right spatial image from the vantage of an ideal listener "sweet spot," focusing on providing a balanced SPL and frequency response for each driver from that position, and ignoring time-based asymmetries that exist in the actual configuration. After this speaker matching is achieved, the delay and gain processor 750 time aligns and further perceptually balances the spatial image from a particular listener head position, given the actual physical asymmetries in the rendering/listening system (e.g., off-center head position and/or non-equivalent loudspeaker-to-head distances).

The delay and gain values applied by the delay and gain processor 750 may be set to address a static system configuration, such as a mobile phone employing orthogonally oriented loudspeakers, or a listener laterally offset from the ideal listening sweet spot in front of a speaker, such as a home theater soundbar, for example.

The delay and gain values applied by the delay and gain processor 750 may also be dynamically adjusted based on changing spatial relationships between the listener's head and the loudspeakers, as might occur in a gaming scenario employing physical movement as a component of game play (e.g., location tracking using a depth-camera, such as for gaming or artificial reality systems). In some embodiments, an audio processing system includes a camera, light sensor, proximity sensor, or some other suitable device that is used to determine the location of the listener's head relative to the speakers. The determined location of the user's head may be used to determine the delay and gain values of the delay and gain processor 750.

Audio analysis routines can provide the appropriate inter-speaker delays and gains used to configure the b-chain processor 224, resulting in a time-aligned and perceptually balanced left/right stereo image. In some embodiments, in the absence of measurable data from such analysis methods, intuitive manual user controls, or automated control via computer vision or other sensor input, can be achieved using a mapping as defined by equations 11 and 12 below:

$$\text{delay} \equiv \begin{cases} \begin{bmatrix} 0 \\ |delayDelta| \end{bmatrix}, & delayDelta \geq 0 \\ \begin{bmatrix} |delayDelta| \\ 0 \end{bmatrix}, & delayDelta < 0 \end{cases} \quad \text{Eq. (11)}$$

$$\text{gain} \equiv \begin{cases} \begin{bmatrix} 0 \\ -1.5|delayDelta| \end{bmatrix}, & delayDelta \geq 0 \\ \begin{bmatrix} -1.5|delayDelta| \\ 0 \end{bmatrix}, & delayDelta < 0 \end{cases} \quad \text{Eq. (12)}$$

where delayDelta and delay are in milliseconds, and, gain is in decibels. The delay and gain column vectors assume their first component pertains to the left channel and their second to the right. Thus, delayDelta≥0 indicates left speaker delay is greater than or equal to right speaker delay, and delayDelta<0 indicates left delay speaker is less than right speaker delay.

In some embodiments, instead of applying attenuation to a channel, an equal amount of gain may be applied to the opposite channel, or a combination of gain applied to one channel and attenuation to the other channel. For example, a gain may be applied to the left channel rather than an attenuation on the left channel. For near-field listening, as occurs on mobile, desktop PC and console gaming, and home-theater scenarios, the distance deltas between a listener position and each loudspeaker are small enough, and therefore the SPL deltas between a listener position and each loudspeaker are small enough, such that any of the above mappings will serve to successfully restore the transaural spatial image while maintaining an overall acceptably loud sound stage, in comparison to an ideal listener/speaker configuration Example Audio System Processing A result of an optimally tuned audio processing system 200 (also referred to as an "VS-X system") is an enhanced and spatially immersive transaural sound field, as perceived from the ideal listener "sweet spot," containing mostly spatial energy above 500-1000 Hz, but with enough low frequency energy rendered via the "broadband" micro-loudspeaker as to provide the perception of a full-band musical (or cinematic, etc.) listening experience.

Using VS-X, including the subband spatial processing (or other spatial enhancement processing), and assuming the appropriate amplification for both speakers, a mobile device with unmatched and non-ideally angled speakers can be transformed from a traditionally mono playback device to a perceived front-firing immersive stereo device.

Figure 8:
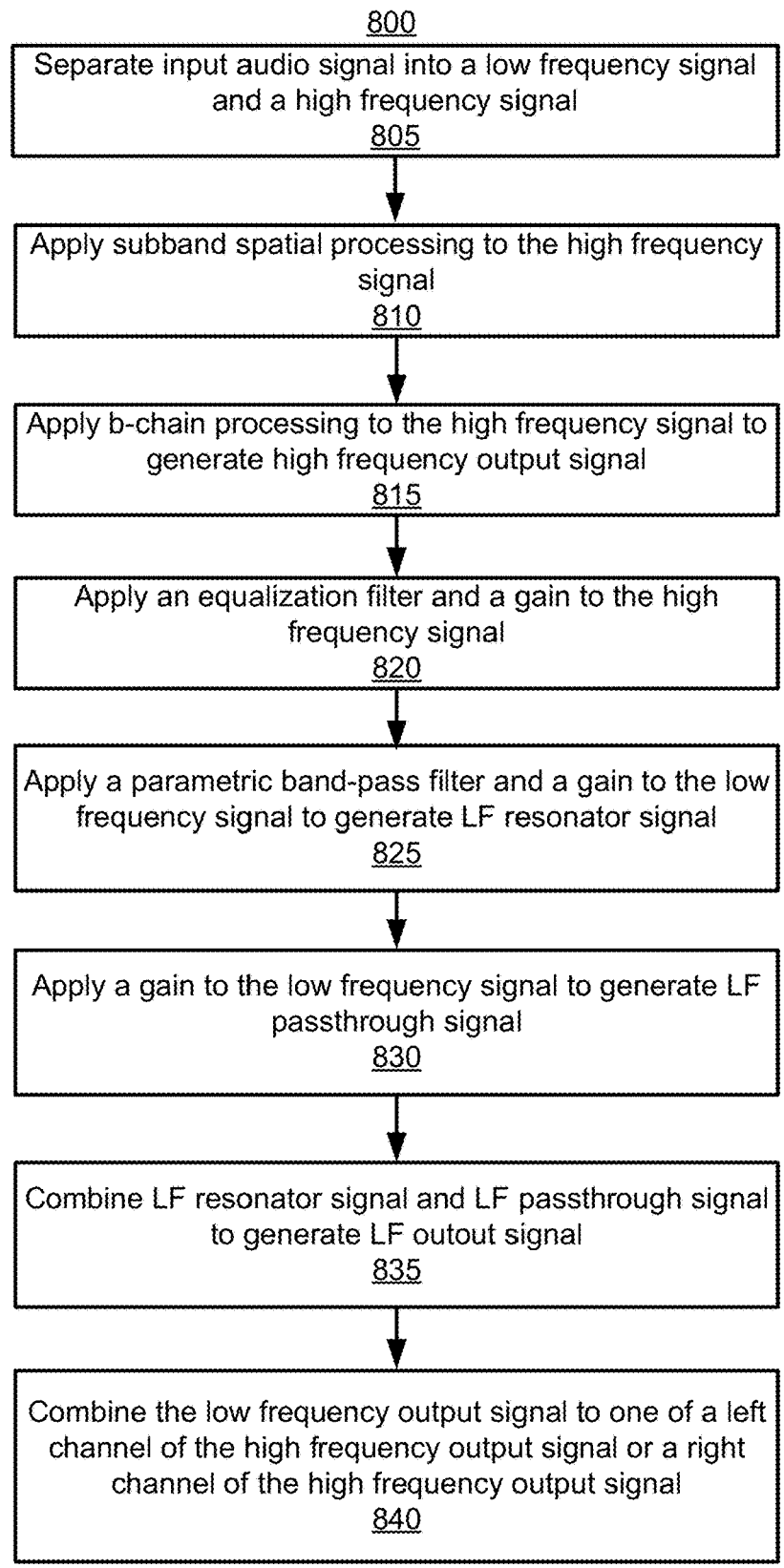
FIG. 8 is a flow chart of a process for virtual stereo audio reproduction (VS-X) processing of an input audio signal, in accordance with some embodiments.

FIG. 8 is a flow chart of a process 800 for virtual stereo audio reproduction (VS-X) processing of an input audio signal, in accordance with some embodiments. The process 800 is discussed as being performed by the audio processing system 200, although other types of computing devices or circuitry may be used. The process 800 may include fewer or additional steps, and steps may be performed in different orders.

An audio processing system 200 (e.g., crossover network 202) separates 805 an input audio signal into a low frequency signal and a high frequency signal.

The audio processing system 200 (e.g., high frequency processor 206) applies 810 subband spatial processing to the high frequency signal. Applying the subband spatial processing may include gain adjusting mid subband components and side subband components of the high frequency signal to generate a high frequency output signal. The subband spatial processing enhances the spatial sense of the sound field for the high frequency signal. The subband spatial processing may further include crosstalk compensation and crosstalk cancellation.

The audio processing system 200 (e.g., high frequency processor 206) applies 815 b-chain processing to the high frequency signal to adjust for an asymmetry between the speakers 110L and 110R. The b-chain processing corrects relative differences in delay, signal level, or frequency response between the speakers 110L and 110R, resulting in high frequency output signal having a restored near-ideal spatial image, as if the listener 140 (e.g., head position) and/or rendering system were ideally configured. In some embodiments, the audio processing system 200 determine asymmetries between the left speaker and the right speaker in frequency response, time alignment, and signal level for a listening position. The audio processing system 200 generates a left channel of the high frequency output signal and a right channel of the high frequency output signal by: applying an N-band equalization to the high frequency signal to adjust for the asymmetry in the frequency response, applying a delay to the high frequency signal to adjust for the asymmetry in the time alignment, and applying a gain to the high frequency signal to adjust for the asymmetry in the signal level.

The audio processing system 200 (e.g., the high frequency processor 204) applies 820 an equalization filter to adjust a left channel of the high frequency signal relative to a right channel of the high frequency signal, and a gain to the high frequency signal to adjust the high frequency signal relative to the low frequency signal. For example, the HF EQ filter 226 applies to equalization filter, and the HF gain 228 applies the gain.

The audio processing system 200 (e.g., low frequency processor 204) applies 825 a parametric band-pass filter and gain to the low frequency signal. For example, the LF boost resonator 214 may include the parametric band-pass filter. The filter may enhance one or more targeted portions of the mid/low frequency spectrum. The filter may also adjust the low frequency signal based on a frequency response of a "broadband" micro-loudspeaker that is to receive the processed low frequency signal. Furthermore the LF boost gain 216 applies a gain to the output of the filter to generate a low frequency resonator signal.

The audio processing system 200 (e.g., the low frequency processor 204) applies 830 a gain to the low frequency signal to generate a low frequency passthrough signal. For example, the LF passthrough gain 218 attenuates the overall low frequency signal band.

The audio processing system (e.g., the low frequency processor 204) combines 835 the low frequency resonator signal with the low frequency passthrough signal to generate a low frequency output signal.

The audio processing system 200 combines 840 the low frequency output signal to one of a left channel of the high frequency output signal or a right channel of the high frequency output signal. For example, the low frequency output signal is provided to a speaker more capable of handling low frequency reproduction in a mismatched speaker system, such as a "broad-band" micro-loudspeaker 110R of the device 100. Furthermore, the low frequency output signal is not provided to another speaker that is less capable of handling the low frequency reproduction, such as the earpiece speaker 110L of the device 100.

As such, the audio processing system generates an output signal including a left output channel and a right output channel. The left output channel includes the left channel of the high frequency output signal, and the right output channel includes the right channel of the high frequency output signal. Furthermore, one of the left output channel or the right output channel includes the low frequency output signal for the speaker more capable of handling lower frequencies in a mismatched speaker system.

The steps process 800 may be performed in various orders. For example, the steps 810, 815, and 820 for processing the high frequency signal may be performed in parallel with the steps 825, 830, and 835 for the processing the low frequency signal. Furthermore, the steps 825 and 830 may be performed in parallel for the low frequency signal.

Figure 9:
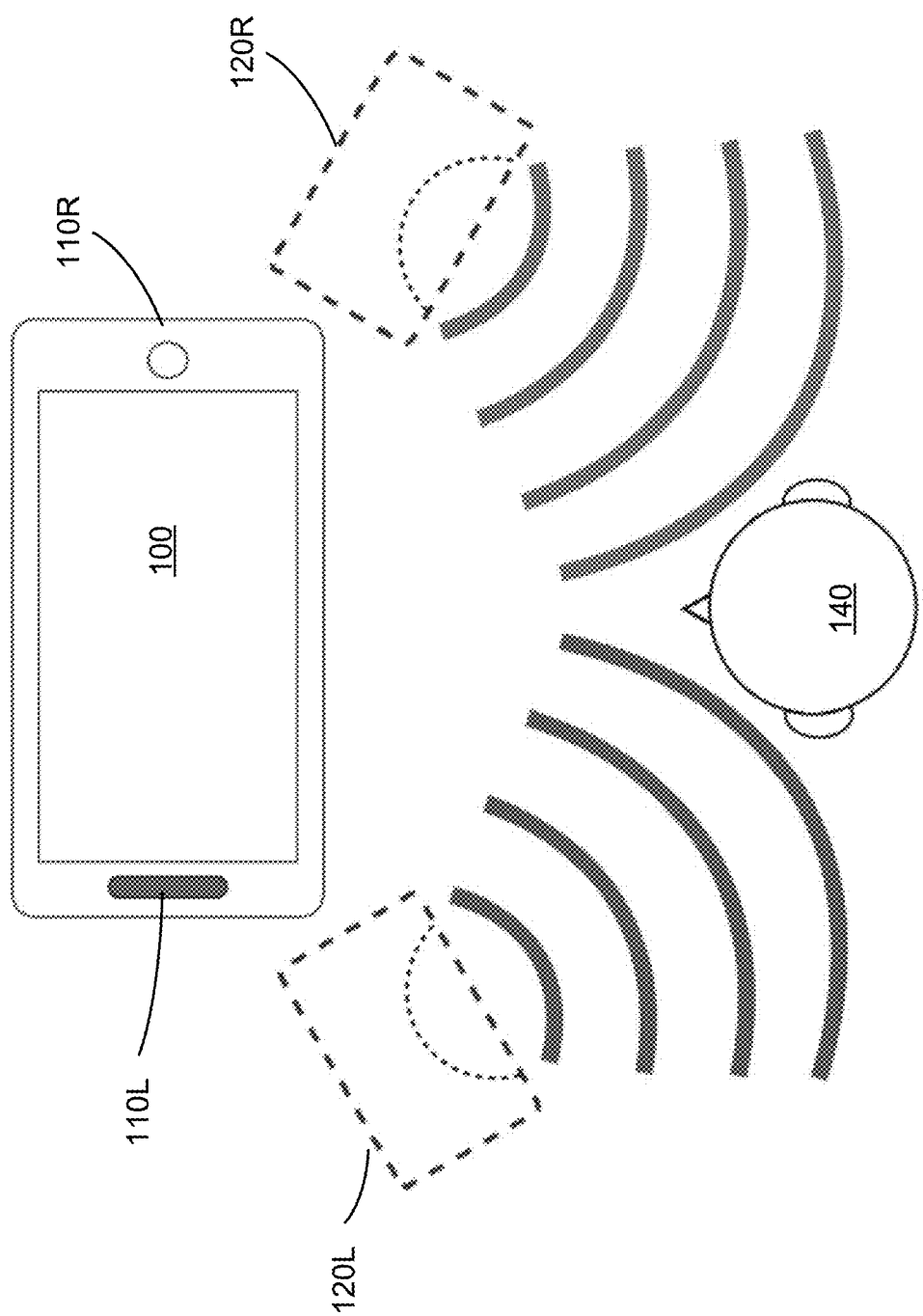
FIG. 9 is an example of a perceived sound field of the mobile device shown in FIG. 1 after VS-X processing, in accordance with some embodiments.

FIG. 9 is an example of a perceived sound field of the mobile device 100 shown in FIG. 1 after VS-X processing, in accordance with some embodiments. The left output channel $O_L$ from the audio processing system 200 has been provided to the left speaker $110_L$, and the right output channel $O_R$ from the audio processing system 200 has been provided to the right speaker $110_R$. The resulting sound field from the mismatched left speaker $110_L$ and right speaker $110_R$ is perceived by the listener 140 as originating from matched, virtual speakers $120_L$ and $120_R$.

Example Computing System

It is noted that the systems and processes described herein may be embodied in an embedded electronic circuit or electronic system. The systems and processes also may be embodied in a computing system that includes one or more processing systems (e.g., a digital signal processor) and a memory (e.g., programmed read only memory or programmable solid state memory), or some other circuitry such as an application specific integrated circuit (ASIC) or field-programmable gate array (FPGA) circuit.

Figure 10:
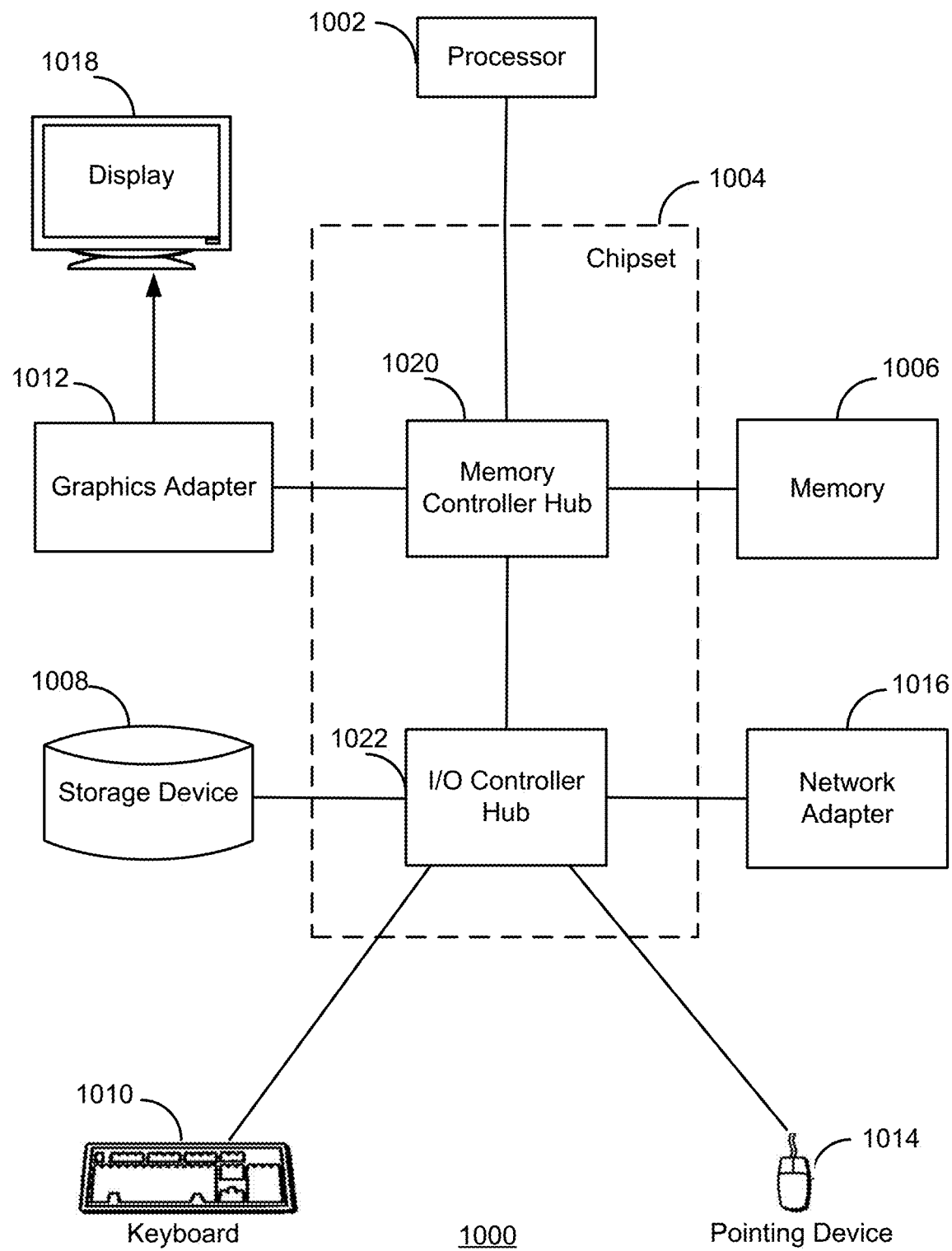
FIG. 10 is a schematic block diagram of a computer system, in accordance with some embodiments.

FIG. 10 illustrates an example of a computer system 1000, according to one embodiment. The audio processing system 200 may be implemented on the system 1000. Illustrated are at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 1020, and a display device 1018 is coupled to the graphics adapter 1012. A storage device 1008, keyboard 1010, pointing device 1014, and network adapter 1016 are coupled to the I/O controller hub 1022. Other embodiments of the computer 1000 have different architectures. For example, the memory 1006 is directly coupled to the processor 1002 in some embodiments.

The storage device 1008 includes one or more non-transitory computer-readable storage media such as a hard drive, compact disk read-only memory (CD-ROM), DVD, or a solid-state memory device. The memory 1006 holds program code (or software) and data used by the processor 1002. The program code may be one or more instructions executable by the processor 1002. For example, the memory 1006 may store instructions that when executed by the processor 1002 causes or configures the processor 1002 to perform the functionality discussed herein, such as the process 800. The pointing device 1014 is used in combination with the keyboard 1010 to input data into the computer system 1000. The graphics adapter 1012 displays images and other information on the display device 1018. In some embodiments, the display device 1018 includes a touch screen capability for receiving user input and selections. The network adapter 1016 couples the computer system 1000 to a network. Some embodiments of the computer 1000 have different and/or other components than those shown in FIG. 10. For example, the computer system 1000 may be a server that lacks a display device, keyboard, and other components, or may use other types of input devices.

Additional Considerations

The disclosed configuration may include a number of benefits and/or advantages. For example, an input signal can be output to unmatched loudspeakers while preserving or enhancing a spatial sense of the sound field. A high quality listening experience can be achieved even when the speakers are unmatched or when the listener is not in an ideal listening position relative to the speakers.

Upon reading this disclosure, those of skill in the art will appreciate still additional alternative embodiments of the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

Any of the steps, operations, or processes described herein may be performed or implemented with one or more hardware or software modules, alone or in combination with other devices. In one embodiment, a software module is implemented with a computer program product comprising a computer readable medium (e.g., non-transitory computer readable medium) containing computer program code, which can be executed by a computer processor for performing any or all of the steps, operations, or processes described.

What is claimed is:

1. A system for processing an input audio signal, comprising:
   a processing circuitry configured to:
   separate the input audio signal into a low frequency signal and a high frequency signal;
   apply a band-pass filter to the low frequency signal to generate a low frequency resonator signal;
   apply a gain to the low frequency signal to generate a low frequency passthrough signal;
   generate a low frequency output signal by combining the low frequency resonator signal with the low frequency passthrough signal; and
   generate an output signal by combining the low frequency output signal with one of a left channel of the high frequency signal for a left speaker or a right channel of the high frequency signal for a right speaker.

2. The system of claim 1, wherein the processing circuitry is further configured to apply a b-chain processing to the high frequency signal to adjust for an asymmetry between the left speaker and the right speaker based on at least one of:
   application of an N-band equalization to the high frequency signal to adjust for an asymmetry in a frequency response for a listening position;
   application of a delay to the high frequency signal to adjust for an asymmetry in time alignment for the listening position; or
   application of another gain to the high frequency signal to adjust for an asymmetry in a signal level for the listening position.

3. The system of claim 1, wherein the processing circuitry is further configured to:
   apply an equalization filter to adjust the left channel of the high frequency signal relative to the right channel of the high frequency signal; and
   apply another gain to at least one of the left channel or the right channel of the high frequency signal to adjust the high frequency signal relative to the low frequency signal.

4. The system of claim 1, wherein the processing circuitry is further configured to apply subband spatial processing to the high frequency signal by gain adjusting mid subband components and side subband components of the high frequency signal.

5. The system of claim 4, wherein the processing circuitry is further configured to, subsequent to the subband spatial processing, apply an N-band equalization to at least one of the left channel or the right channel of the high frequency signal.

6. The system of claim 4, wherein the processing circuitry is further configured to, subsequent to the subband spatial processing, apply a delay to at least one of the left channel or the right channel of the high frequency signal.

7. The system of claim 4, wherein the processing circuitry is further configured to, subsequent to the subband spatial processing, apply another gain to one of the left channel or the right channel of the high frequency signal.

8. The system of claim 1, wherein the band-pass filter adjusts the low frequency signal according to a frequency response characteristic of a micro-loudspeaker.

9. The system of claim 1, wherein the band-pass filter enhances one or more portions of a frequency spectrum of the low frequency signal.

10. The system of claim 1, wherein:
    one of the left speaker or the right speaker is an earpiece speaker;
    another one of the left speaker or the right speaker is a micro-loudspeaker; and
    the low frequency output signal is provided to the micro-loudspeaker.

11. A non-transitory computer readable medium comprising stored program code, the program code when executed by at least one processor configures the at least one processor to:
    separate an input audio signal into a low frequency signal and a high frequency signal;
    apply a band-pass filter to the low frequency signal to generate a low frequency resonator signal;
    apply a gain to the low frequency signal to generate a low frequency passthrough signal;
    generate a low frequency output signal by combining the low frequency resonator signal with the low frequency passthrough signal; and
    generate an output signal by combining the low frequency output signal with one of a left channel of the high frequency signal for a left speaker or a right channel of the high frequency signal for a right speaker.

12. The computer readable medium of claim 11, wherein the program code further configures the at least one processor to apply a b-chain processing to the high frequency signal to adjust for an asymmetry between the left speaker and the right speaker based on at least one of:
    application of an N-band equalization to the high frequency signal to adjust for an asymmetry in a frequency response for a listening position;
    application of a delay to the high frequency signal to adjust for an asymmetry in time alignment for the listening position; or
    application of another gain to the high frequency signal to adjust for an asymmetry in a signal level for the listening position.

13. The computer readable medium of claim 11, wherein the program code further configures the at least one processor to:
    apply an equalization filter to adjust the left channel of the high frequency signal relative to the right channel of the high frequency signal; and
    apply another gain to at least one of the left channel or the right channel of the high frequency signal to adjust the high frequency signal relative to the low frequency signal.

14. The computer readable medium of claim 11, wherein the program code further configures the at least one processor to apply subband spatial processing to the high frequency signal by gain adjusting mid subband components and side subband components of the high frequency signal.

15. The computer readable medium of claim 14, wherein the program code further configures the at least one processor to, subsequent to the subband spatial processing, apply an N-band equalization to at least one of the left channel or the right channel of the high frequency signal.

16. The computer readable medium of claim 14, wherein the program code further configures the at least one processor to, subsequent to the subband spatial processing, apply a delay to at least one of the left channel or the right channel of the high frequency signal.

17. The computer readable medium of claim 14, wherein the program code further configures the at least one processor to, subsequent to the subband spatial processing, apply another gain to one of the left channel or the right channel of the high frequency signal.

18. The computer readable medium of claim 11, wherein the band-pass filter adjusts the low frequency signal according to a frequency response characteristic of a micro-loudspeaker.

19. The computer readable medium of claim 11, wherein the band-pass filter enhances one or more portions of a frequency spectrum of the low frequency signal.

20. The computer readable medium of claim 11 wherein:
one of the left speaker or the right speaker is an earpiece speaker;
another one of the left speaker or the right speaker is a micro-loudspeaker; and
the low frequency output signal is provided to the micro-loudspeaker.

21. A method of processing an input audio signal, comprising, by a computing system:
separating the input audio signal into a low frequency signal and a high frequency signal;
applying a band-pass filter to the low frequency signal to generate a low frequency resonator signal;
applying a gain to the low frequency signal to generate a low frequency passthrough signal;
generating a low frequency output signal by combining the low frequency resonator signal with the low frequency passthrough signal; and
generating an output signal by combining the low frequency output signal with one of a left channel of the high frequency signal for a left speaker or a right channel of the high frequency signal for a right speaker.

22. The method of claim 21, further comprising applying a b-chain processing to the high frequency signal to adjust for an asymmetry between the left speaker and the right speaker based on at least one of:
applying an N-band equalization to the high frequency signal to adjust for an asymmetry in a frequency response for a listening position;
applying a delay to the high frequency signal to adjust for an asymmetry in time alignment for the listening position; or
applying another gain to the high frequency signal to adjust for an asymmetry in a signal level for the listening position.

23. The method of claim 21, further comprising:
applying an equalization filter to adjust the left channel of the high frequency signal relative to the right channel of the high frequency signal; and
applying another gain to at least one of the left channel or the right channel of the high frequency signal to adjust the high frequency signal relative to the low frequency signal.

24. The method of claim 21, further comprising applying subband spatial processing to the high frequency signal by gain adjusting mid subband components and side subband components of the high frequency signal.

25. The method of claim 24, further comprising, subsequent to the subband spatial processing, applying an N-band equalization to at least one of the left channel or the right channel of the high frequency signal.

26. The method of claim 24, further comprising, subsequent to the subband spatial processing, applying a delay to at least one of the left channel or the right channel of the high frequency signal.

27. The method of claim 24, further comprising, subsequent to the subband spatial processing, applying another gain to one of the left channel or the right channel of the high frequency signal.

28. The method of claim 21, wherein the band-pass filter adjusts the low frequency signal according to a frequency response characteristic of a micro-loudspeaker.

29. The method of claim 21, wherein the band-pass filter enhances one or more portions of a frequency spectrum of the low frequency signal.

30. The method of claim 21, wherein:
one of the left speaker or the right speaker is an earpiece speaker;
another one of the left speaker or the right speaker is a micro-loudspeaker; and
the low frequency output signal is provided to the micro-loudspeaker.

* * * * *

UNITED STATES PATENT AND TRADEMARK OFFICE
CERTIFICATE OF CORRECTION

PATENT NO. : 10,951,986 B2  
APPLICATION NO. : 16/590237  
DATED : March 16, 2021  
INVENTOR(S) : Zachary Seldess Page 1 of 1

It is certified that error appears in the above-identified patent and that said Letters Patent is hereby corrected as shown below:

In the Claims

In Column 21, in Claim 2, Line 38, delete "application of" and insert -- applying --, therefor.

In Column 21, in Claim 2, Line 41, delete "application of" and insert -- applying --, therefor.

In Column 21, in Claim 2, Line 44, delete "application of" and insert -- applying --, therefor.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*